US012056294B2

(12) United States Patent
Yoshitomi et al.

(10) Patent No.: US 12,056,294 B2
(45) Date of Patent: Aug. 6, 2024

(54) INFORMATION PROCESSING SYSTEM, INFORMATION PROCESSING APPARATUS, AND CONTROL METHOD

(71) Applicant: Lenovo (Singapore) Pte. Ltd., Singapore (SG)

(72) Inventors: Keiichi Yoshitomi, Kanagawa (JP); Mitsuhiro Yamazaki, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/139,122

(22) Filed: Apr. 25, 2023

(65) Prior Publication Data

US 2023/0409128 A1 Dec. 21, 2023

(30) Foreign Application Priority Data

Jun. 17, 2022 (JP) .................................. 2022-097987

(51) Int. Cl.
| | |
|---|---|
| *G06F 3/046* | (2006.01) |
| *G06F 3/033* | (2013.01) |
| *G06F 3/0354* | (2013.01) |
| *G06F 3/038* | (2013.01) |
| *G06F 3/041* | (2006.01) |

(52) U.S. Cl.
CPC .......... *G06F 3/03545* (2013.01); *G06F 3/038* (2013.01); *G06F 3/0416* (2013.01)

(58) Field of Classification Search
CPC .................................................. G06F 3/03545
See application file for complete search history.

(56) References Cited

U.S. PATENT DOCUMENTS

| | | | | |
|---|---|---|---|---|
| 2013/0009907 | A1* | 1/2013 | Rosenberg | G06F 3/046 |
| | | | | 345/174 |
| 2017/0068337 | A1* | 3/2017 | Bhandari | H01G 5/12 |
| 2017/0253191 | A1 | 9/2017 | Nash et al. | |
| 2021/0124438 | A1* | 4/2021 | Wang | G06F 3/0441 |

FOREIGN PATENT DOCUMENTS

| | | |
|---|---|---|
| CN | 214670510 U | 11/2021 |
| JP | H06332609 A | 12/1994 |
| JP | 2008-013299 A | 1/2008 |

(Continued)

OTHER PUBLICATIONS

Written Opinion issued in counterpart Korean Application No. 10-2021-0115526; Dated May 24, 2023 (11 pages).

(Continued)

*Primary Examiner* — Nan-Ying Yang
(74) *Attorney, Agent, or Firm* — Osha Bergman Watanabe & Burton LLP

(57) ABSTRACT

An information processing system includes a pen having a vibration generator; a display unit with a screen; a touch sensor unit to detect a contact position of the pen on the screen of the display unit; an angle detector to detect a pen angle, which indicates a direction on the screen in which the pen in contact with the screen is tilted; and a pen vibration control unit to generate a vibration waveform signal based on the pen angle detected by the angle detector and a movement direction of the pen to vibrate the vibration generator based on the generated vibration waveform signal.

9 Claims, 14 Drawing Sheets

(56) References Cited

FOREIGN PATENT DOCUMENTS

| | | |
|---|---|---|
| JP | 2014112357 A | 6/2014 |
| JP | 2014174801 A | 9/2014 |
| JP | 2014222488 A | 11/2014 |
| JP | 2019066960 A | 4/2019 |
| JP | 2022067618 A | 5/2022 |
| KR | 10-2013-0115558 A | 10/2013 |
| KR | 101751237 B1 | 6/2017 |
| KR | 10-2018-0126707 A | 11/2018 |
| WO | 2008078523 A1 | 7/2008 |

OTHER PUBLICATIONS

International Search Report and Written Opinion issued Dec. 5, 2022, in corresponding International Application No. PCT/KR2022/013005 (2 pages).

Neonode Inc. (2020, April 2). "Neonode's Holographic Contactless Touch for Elevators." [Video]. YouTube. https://youtu.be/sKT_sAKFO38.

\* cited by examiner

| REFERENCE AZIMUTH ANGLE | REFERENCE VIBRATION WAVEFORM INFORMATION |
|---|---|
| 0 DEGREES | REFERENCE VIBRATION WAVEFORM INFORMATION FOR 0 DEGREES |
| 45 DEGREES | REFERENCE VIBRATION WAVEFORM INFORMATION FOR 45 DEGREES |
| 90 DEGREES | REFERENCE VIBRATION WAVEFORM INFORMATION FOR 90 DEGREES |
| 135 DEGREES | REFERENCE VIBRATION WAVEFORM INFORMATION FOR 135 DEGREES |
| 180 DEGREES | REFERENCE VIBRATION WAVEFORM INFORMATION FOR 180 DEGREES |

FIG. 6

| AZIMUTH ANGLE | SYNTHESIS VOLUME OF REFERENCE VIBRATION WAVEFORM (%) | | | | |
|---|---|---|---|---|---|
| | 0 DEGREES | 45 DEGREES | 90 DEGREES | 135 DEGREES | 180 DEGREES |
| 0 DEGREES | 100 | 0 | 0 | 0 | 0 |
| 10 DEGREES | 77.8 | 22.2 | 0 | 0 | 0 |
| 20 DEGREES | 55 | 45 | 0 | 0 | 0 |
| 30 DEGREES | 33.3 | 66.7 | 0 | 0 | 0 |
| 40 DEGREES | 11.1 | 88.9 | 0 | 0 | 0 |
| ... | ... | ... | ... | ... | ... |
| 90 DEGREES | 0 | 0 | 100 | 0 | 0 |
| ... | ... | ... | ... | ... | ... |
| 140 DEGREES | 0 | 0 | 0 | 88.9 | 11.1 |
| ... | ... | ... | ... | ... | ... |
| 170 DEGREES | 0 | 0 | 0 | 22.2 | 77.8 |
| 180 DEGREES | 0 | 0 | 0 | 0 | 100 |

FIG. 7

| REFERENCE AZIMUTH ANGLE | FILTER INFORMATION |
|---|---|
| 0 DEGREES | FILTER INFORMATION FOR 0 DEGREES |
| 45 DEGREES | FILTER INFORMATION FOR 45 DEGREES |
| 90 DEGREES | FILTER INFORMATION FOR 90 DEGREES |
| 135 DEGREES | FILTER INFORMATION FOR 135 DEGREES |
| 180 DEGREES | FILTER INFORMATION FOR 180 DEGREES |

INFORMATION PROCESSING SYSTEM, INFORMATION PROCESSING APPARATUS, AND CONTROL METHOD

CROSS-REFERENCE TO RELATED APPLICATIONS

This application claims priority to Japanese Patent Application No. 2022-97987 filed on Jun. 17, 2022, the contents of which are hereby incorporated herein by reference in their entirety.

BACKGROUND OF THE INVENTION

Field of the Invention

The present invention relates to an information processing system, an information processing apparatus, and a control method.

Description of the Related Art

Information processing apparatuses (e.g., tablet terminals) enabling handwrite inputting with pen have been known (see Japanese Unexamined Patent Application Publication No. 2014-174801, for example). Such an information processing apparatus includes a touch screen that accepts handwrite inputting with a pen that is in contact with the screen and moves thereon, and is able to acquire the input information such as a movement locus of the pen.

With the conventional technology as described above, users move a pen (e.g., stylus pen) that is in contact with the screen to input letters and drawings. Therefore, it has a problem that the smoothness and texture differ from those of real paper and writing tools, thus degrading user friendliness.

SUMMARY OF THE INVENTION

The present invention aims to provide an information processing system, an information processing apparatus, and a control method that reduce discomfort about the smoothness and texture during pen inputting and thus enhance user experience.

The first aspect of the present invention relates to an information processing system including: a pen having a vibration generator; a display unit with a screen; a touch sensor unit configured to detect a contact position of the pen on the screen of the display unit; an angle detector configured to detect a pen angle, which indicates a direction on the screen in which the pen in contact with the screen is tilted; and a pen vibration control unit configured to generate a vibration waveform signal based on the pen angle detected by the angle detector and a movement direction of the pen to vibrate the vibration generator based on the generated vibration waveform signal.

In the information processing system according to the first aspect of the present invention, the pen vibration control unit may generate the vibration waveform signal based on an azimuth angle, which indicates the movement direction relative to a direction indicated by the pen angle.

In the information processing system according to the first aspect of the present invention, the pen vibration control unit may generate the vibration waveform signal based on reference vibration waveform information corresponding to each of a plurality of reference azimuth angles that are different predefined angles, and the azimuth angle.

In the information processing system according to the first aspect of the present invention, the pen vibration control unit may execute synthesis process of changing an amplitude of each piece of the reference vibration waveform information in accordance with the azimuth angle, and thus generate the vibration waveform signal.

In the information processing system according to the first aspect of the present invention, the pen vibration control unit may perform filtering of a base waveform signal, which is a basis of the vibration waveform signal, based on a set of filter coefficients corresponding to each of a plurality of reference azimuth angles that are preset different angles and the azimuth angle, and thus generate the vibration waveform signal.

In the information processing system according to the first aspect of the present invention, the pen vibration control unit may change an amplitude of a base waveform signal, which is a basis of the vibration waveform signal, according to the azimuth angle, and thus generate the vibration waveform signal.

In the information processing system according to the first aspect of the present invention, the pen vibration control unit may change an amplitude of the vibration waveform signal in accordance with a contact pressure of the pen in contact with the screen and a movement speed of the pen.

The information processing system according to the first aspect of the present invention includes an information processing apparatus including the display unit, the touch sensor unit, the angle detector, and the pen vibration control unit. The information processing apparatus may transmit the vibration waveform signal to the pen, and the vibration generator may vibrate in accordance with the vibration waveform signal received from the information processing apparatus.

The information processing system according to the first aspect of the present invention includes an information processing apparatus including the display unit, the touch sensor unit, and the angle detector, the pen including the vibration generator and the pen vibration control unit. The information processing apparatus may transmit the pen angle and a movement direction of the pen to the pen, and the pen vibration control unit may generate a vibration waveform signal based on the pen angle and the movement direction of the pen received from the information processing apparatus.

The second aspect of the present invention relates to an information processing apparatus including: a display unit with a screen; a touch sensor unit configured to detect a contact position of a pen having a vibration generator on the screen of the display unit; an angle detector configured to detect a pen angle, which indicates a direction on the screen in which the pen in contact with the screen is tilted; and a pen vibration control unit configured to generate a vibration waveform signal based on the pen angle detected by the angle detector and a movement direction of the pen to vibrate the vibration generator based on the generated vibration waveform signal.

The third aspect of the present invention relates to a method for controlling an information processing system including a pen having a vibration generator, a display unit with a screen, and a touch sensor unit configured to detect a contact position of a pen on the screen of the display unit. The method includes the steps of: an angle detector detecting a pen angle, which indicates a direction on the screen in which the pen in contact with the screen is tilted; and a pen vibration control unit generating a vibration waveform signal based on the pen angle detected by the angle detector and a movement direction of the pen to vibrate the vibration generator based on the generated vibration waveform signal.

The above described aspects of the present invention reduce discomfort about the smoothness and texture during pen inputting and thus enhance user experience.

BRIEF DESCRIPTION OF THE DRAWINGS

FIG. 6 illustrates an example of data in a reference waveform information storage unit in the first embodiment.

FIG. 7 illustrates an example of data in a synthesis table storage unit in the first embodiment.

DETAILED DESCRIPTION OF THE INVENTION

The following describes an information processing system, an information processing apparatus, and a control method according to embodiments of the present invention with reference to the drawings.

First Embodiment

Figure 1:
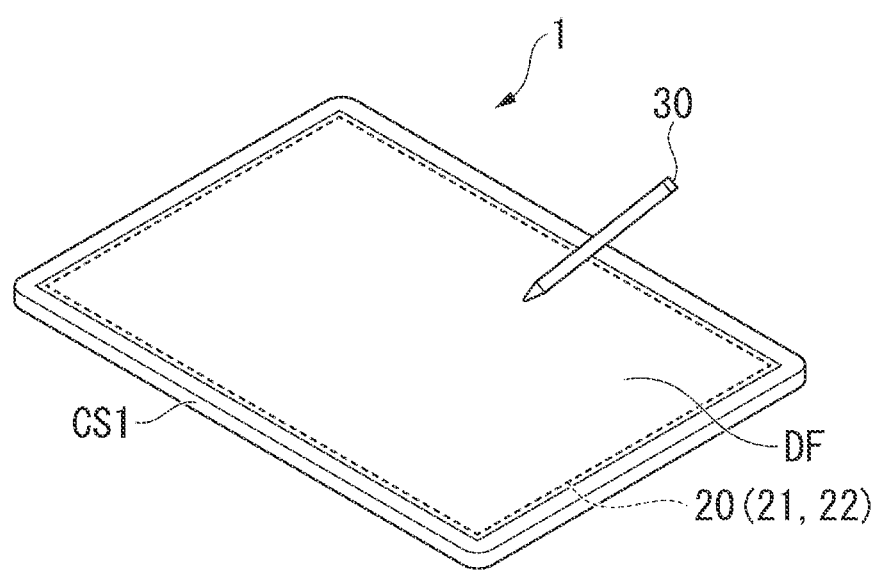
FIG. 1 illustrates the appearance of an information processing system that is one example according to a first embodiment.

FIG. 1 illustrates the appearance of an information processing system 100 that is one example according to the first embodiment.

As illustrated in FIG. 1, the information processing system 100 includes a tablet terminal 1 and a pen 30. The following describes the first embodiment by way of the tablet terminal 1 that is one example of the information processing apparatus.

The tablet terminal 1 includes a touch screen 20 on one principal surface of a chassis CS1, on which the user uses a pen 30 to execute an application program such as notepad and drawing.

The touch screen 20 includes a display unit (display) 21 and a touch sensor unit (touch sensor) 22. The display unit 21 displays various types of information on the display screen DF.

The touch sensor unit 22 is placed to overlap the display unit 21, and detects a contact of the pen 30 with the display screen DF of the display unit 21 and also detects the contact position of the pen 30. The touch sensor unit 22 also detects a pen angle, which indicates the angle of the pen 30 when the pen 30 comes in contact with the display screen DF. The pen angle here indicates the direction on the screen DF that the pen 30 in contact with the screen DF is tilted.

Details of the touch screen 20, display unit 21, and touch sensor unit 22 are described later.

Figure 2:
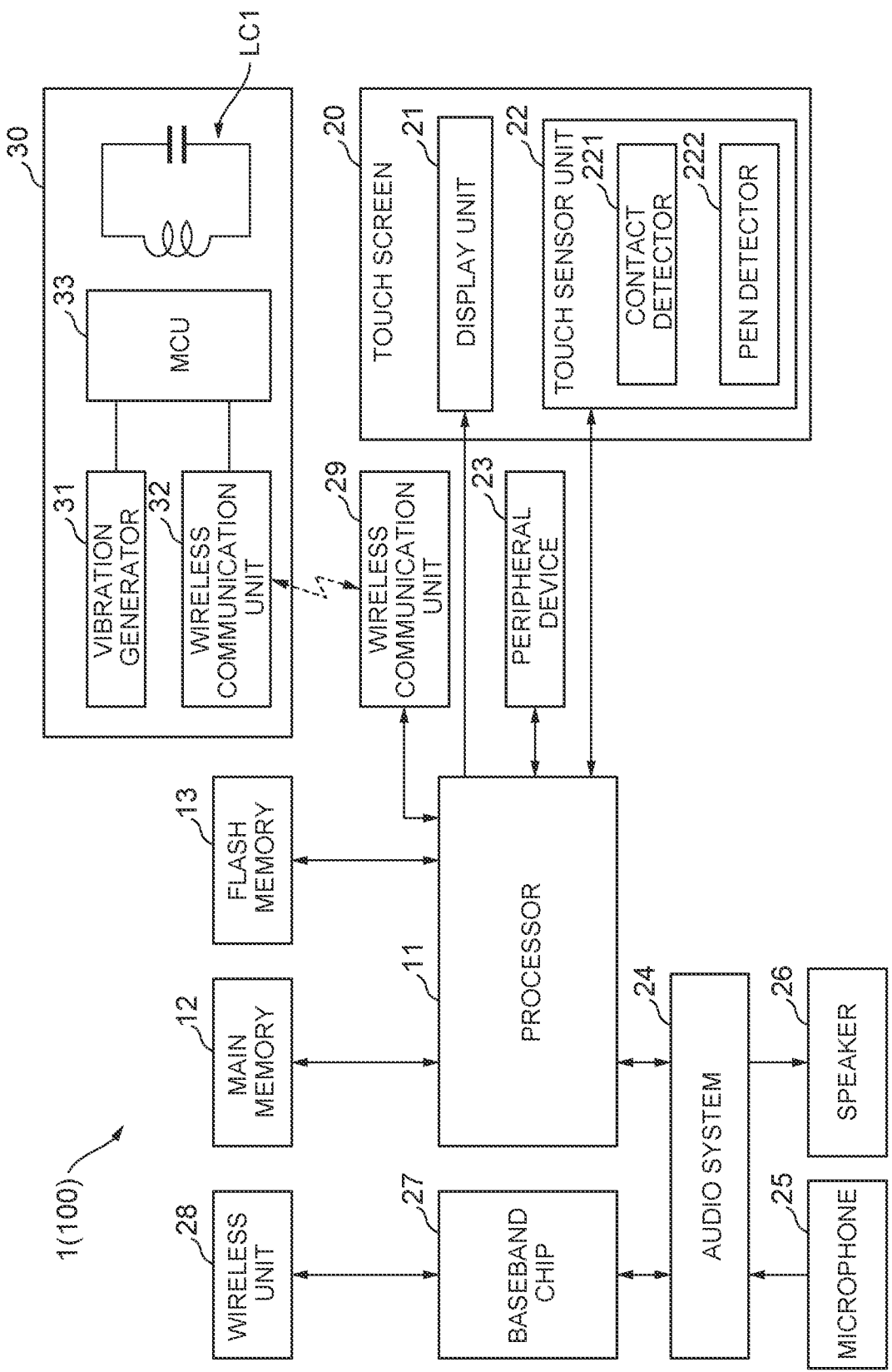
FIG. 2 illustrates one example of the major hardware configuration of the information processing system according to the first embodiment.

Referring next to FIG. 2, the following describes the major hardware configuration of the information processing system 100.

FIG. 2 illustrates one example of the major hardware configuration of the information processing system 100 according to the first embodiment.

As illustrated in FIG. 2, the information processing system 100 includes the tablet terminal 1 and the pen 30. The tablet terminal 1 includes a processor 11, a main memory 12, a flash memory 13, a touch screen 20, a peripheral device 23, an audio system 24, a microphone 25, a speaker 26, a baseband chip 27, a wireless unit 28 and a wireless communication unit 29.

For instance, the processor 11 is an application processor including a central processing unit (CPU). The processor 11 controls the tablet terminal 1 as a whole.

The main memory 12 is a writable memory functioning as a read-in area of a program executed by the processor 11 or a work area to write the data processed by the executed program. For instance, the main memory 12 includes a plurality of dynamic random access memory (DRAM) chips. The program executed includes an OS (operating system), various types of device drivers to operate peripherals that are hardware, various types of service/utility, and application programs (application software).

For instance, the flash memory 13 is a flash electrically erasable programmable read only memory (EEPROM), and stores the OS, various types of drivers, various types of services/utilities, application programs (hereinafter they may be referred to as applications), and various types of data.

For instance, the display unit 21 is a liquid crystal display or an organic electro-luminescence (EL) display, and displays an image on the screen based on the drawing data (display data) output from the processor 11.

The touch sensor unit 22 detects the position of the operating medium that is the pen 30 on the screen of the display unit 21, a contact of the pen 30 with the screen, and the pen angle. For instance, the touch sensor unit 22 detects the approach of the pen 30 within a predetermined distance to the screen of the display unit 21 using the resonance circuit LC1 that the pen 30 has, and thus detects the position of the pen 30 above the screen without contact. The touch sensor unit 22 detects the pen angle, which indicates the angle of the pen 30, using the resonance circuit LC1 of the pen 30.

The touch sensor unit 22 includes a contact detector 221 and a pen detector 222.

For instance, the contact detector 221 is a capacitive touch sensor, which detects the pen 30 in contact with the screen of the display unit 21, as well as the position where the pen 30 is in contact. The contact detector 221 also detects the contact pressure of the pen 30 that is in contact with the screen DF.

For instance, the pen detector 222 is an electromagnetic induction type touch sensor, which uses the resonant circuit LC1 of the pen 30 to detect the position of the pen 30 above the screen of the display unit 21 in a non-contact manner. For instance, the pen detector 222 is able to detect the pen angle when the pen 30 comes in contact with the display screen DF of the display unit 21. The details of the pen angle are described later.

For instance, the peripheral device 23 includes a wireless local area network (WLAN) module, a global positioning system (GPS) module, and sensors such as an acceleration sensor.

For instance, the audio system 24 is an audio integrated circuit (IC), and inputs, records, reproduces, and outputs sound data. For instance, the audio system 24 is connected to the microphone 25 and the speaker 26. For instance, the audio system 24 outputs the sound data collected by the microphone 25 to the processor 11 or the baseband chip 27. For instance, the audio system 24 converts sound data acquired from the processor 11 or the baseband chip 27 into sound signals and outputs them to the speaker 26.

The microphone 25 collects sound around the tablet terminal 1. For instance, the microphone 25 collects sound such as user's voice when making a voice call with another terminal.

The speaker 26 outputs various sounds to the outside of the tablet terminal 1. For instance, the speaker 26 outputs (emits) the sound received from another terminal when making a voice call with the terminal.

For instance, the baseband chip 27 is a dedicated IC that controls wireless communications such as 4G (4th generation mobile communication system) and 5G (5th generation mobile communication system). For instance, the baseband chip 27 causes audio data received with the wireless unit 28 to be output to the speaker 26 via the audio system 24. For instance, the baseband chip 27 acquires sound data collected from the microphone 25 via the audio system 24 and outputs the sound data using the wireless unit 28 via a mobile communication system. The baseband chip 27 also exchanges the input/output data of data communications via the mobile communication system with the processor 11.

The wireless unit 28 is a wireless communication device, including an antenna, for a wireless communication via the mobile communication system.

For instance, the wireless communication unit 29 is a Bluetooth (registered trademark) module, and performs wireless communication with the pen 30. For instance, the wireless communication unit 29 transmits a vibration waveform signal, which will be described later, to the pen 30.

The pen 30 is a pen-shaped operating medium, such as a touch pen or a stylus pen. The pen 30 includes the resonant circuit LC1, a vibration generator 31, a wireless communication unit 32, and a micro controller unit (MCU) 33. The pen 30 is powered by electromagnetic induction to the coil of the resonant circuit LC1 to detect the position and angle of the pen 30 on the screen of the display unit 21.

The vibration generator 31 is a generator that generates vibrations using a piezoelectric vibration generator, for example. The vibration generator 31 may be a speaker that generates vibrations when the pen 30 is used and also generates the sound of the pen 30 being used. The vibration generator 31 generates vibrations based on a vibration waveform signal supplied from the MCU 33, which is described later.

For instance, the wireless communication unit 29 is a Bluetooth (registered trademark) module, and performs wireless communication between the tablet terminal 1 and the pen. For instance, the wireless communication unit 29 receives a vibration waveform signal from the tablet terminal 1 and supplies the received vibration waveform signal to the MCU 33.

The MCU 33 includes a CPU, a memory such as ROM or RAM, and I/O related devices, and controls the pen 30 in an integrated manner. The MCU 33 supplies the vibration waveform signal received by the wireless communication unit 29 to the vibration generator 31, and causes the vibration generator 31 to generate vibrations (or sound) based on the vibration waveform signal.

Figure 3:
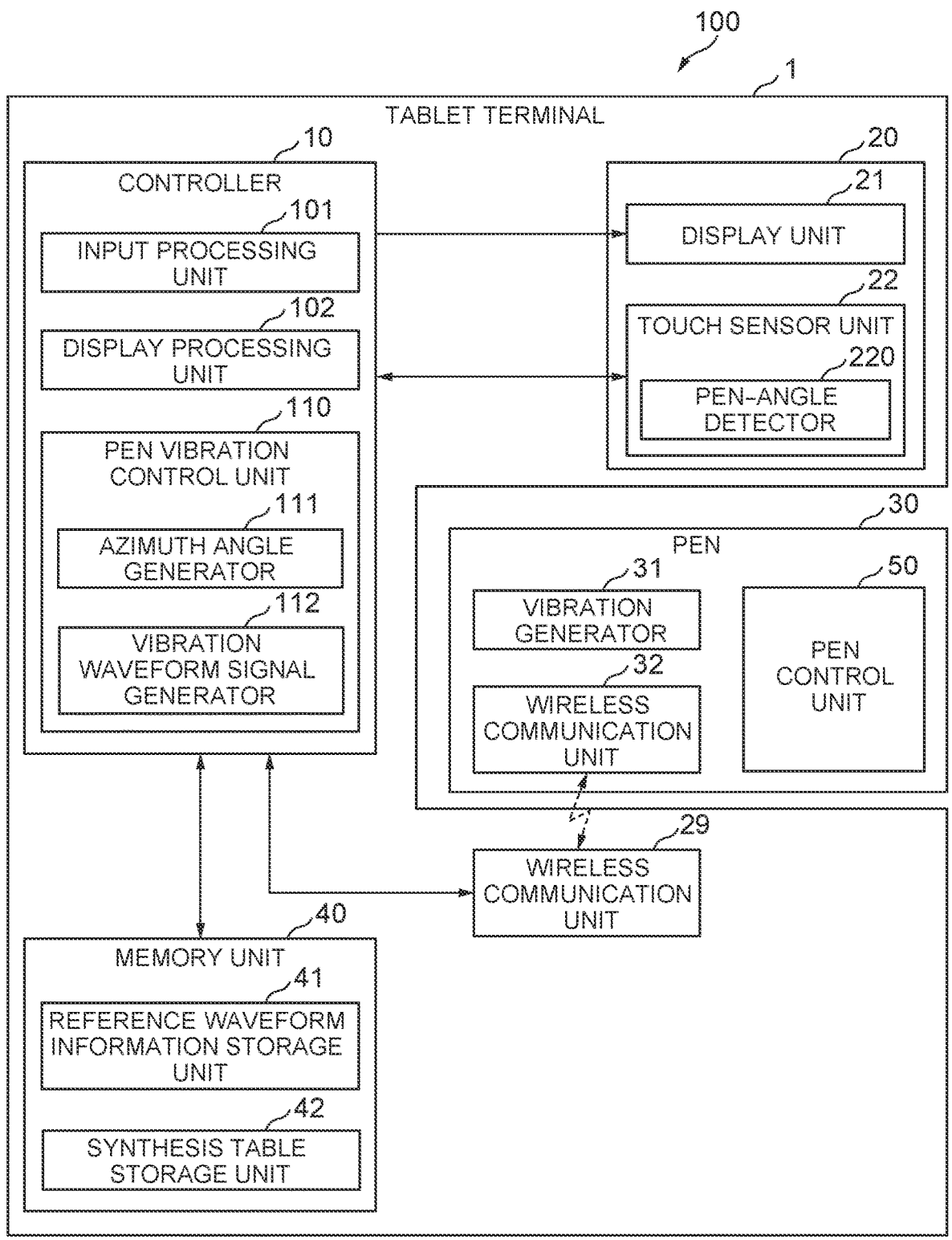
FIG. 3 is a block diagram illustrating one example of the functional configuration of the information processing system according to the first embodiment.

Next referring to FIG. 3, the following describes the functional configuration of the information processing system 100 according to the first embodiment.

FIG. 3 is a block diagram illustrating one example of the functional configuration of the information processing system 100 according to the first embodiment.

As illustrated in FIG. 3, the information processing system 100 includes the tablet terminal 1 and the pen 30, and the tablet terminal 1 includes a controller 10, the touch screen 20, a memory unit 40, and the wireless communication unit 29.

The touch screen 20 includes the display unit 21 and the touch sensor unit 22.

The touch sensor unit 22 includes a pen-angle detector 220.

For instance, the pen-angle detector 220 (one example of an angle detector) is implemented with the pen detector 222, and detects the pen angle, which is the angle of the pen 30 coming in contact with the screen, using the resonant circuit LC1 of the pen 30 and the electromagnetic induction function of the pen detector 222. Now, the pen angle is described with reference to FIG. 4.

Figure 4:
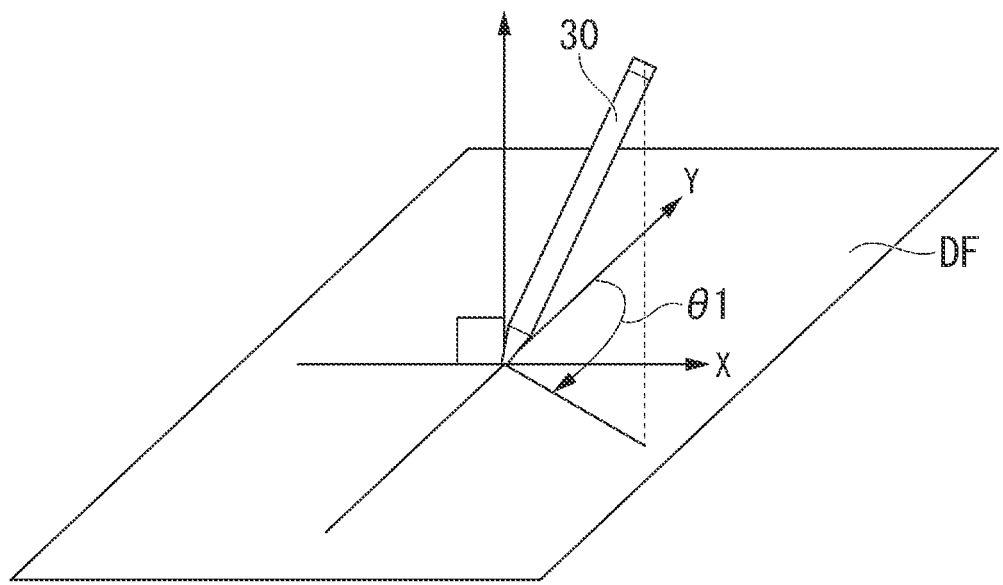
FIG. 4 describes one example of the pen angle in the first embodiment.

FIG. 4 describes one example of the pen angle in the first embodiment.

As illustrated in FIG. 4, the pen angle $\theta 1$ detected by the pen-angle detector 220 indicates the direction on the screen DF in which the pen 30 in contact with the screen DF is tilted. Assume that the short-side direction of the display screen DF of the tablet terminal 1 is X direction and the long-side direction is Y direction. Then, the pen angle $\theta 1$ indicates the angle of the pen 30 on the XY plane relative to the reference azimuth direction (e.g., Y direction).

The angle detector 220 detects the pen angle $\theta 1$ as illustrated in FIG. 4 and outputs it to the controller 10.

Note that the information processing system 100 according to the first embodiment changes a vibration waveform signal based on the pen angle $\theta 1$ as described above and the azimuth angle based on the movement direction of the pen 30.

Figure 5:
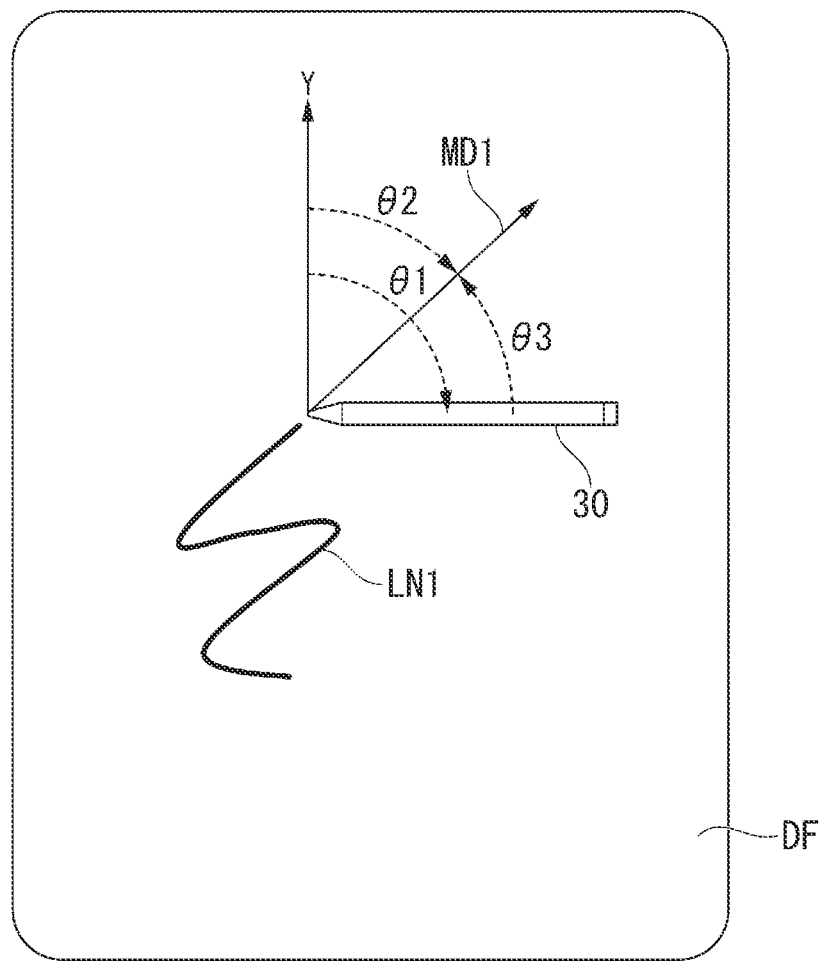
FIG. 5 describes one example of the azimuth angle in the first embodiment.

Referring now to FIG. 5, the following describes the azimuth angle of the first embodiment.

FIG. 5 describes one example of the azimuth angle $\theta 3$ in the first embodiment.

FIG. 5 illustrates the screen DF viewed from directly above. In FIG. 5, the drawing line LN1 indicates the movement locus of the pen 30, and the movement direction MD1 indicates the movement direction of the pen 30.

The azimuth angle θ3 indicates the movement direction MD1 relative to the direction indicated by the pen angle θ1. In the example of FIG. 5, let that the angle θ2 is the angle of the movement direction MD1 relative to the Y direction, which is the reference direction of the screen DF. Then, the azimuth angle θ3 is the absolute value of the angle obtained by subtracting the pen angle θ1 from the angle θ2, as shown in equation (1) below.

$$\text{Azimuth angle } \theta 3 = \text{ABS}(\text{movement direction angle } \theta 2 - \text{pen angle } \theta 1) \quad (1)$$

The azimuth angle θ3 is a minor angle of 0 to 180 degrees.

Referring back to FIG. 3, the memory unit 40 is implemented with the main memory 12 or flash memory 13, for example, and includes a reference waveform information storage unit 41 and a synthesis table storage unit 42.

The reference waveform information storage unit 41 is implemented with the flash memory 13, for example, and stores reference vibration waveform information corresponding to each of a plurality of reference azimuth angles (e.g., 0, 45, 90, 135, and 180 degrees) that are preset different angles. Here, the reference azimuth angles are preset reference azimuth angles θ3. The reference vibration waveform information is obtained by actually sampling the vibration waveform of an actual writing tool (e.g., pen) and paper at the reference azimuth angles. The reference waveform information storage unit 41 stores the reference azimuth angles in association with the reference vibration waveform information. Referring to FIG. 6, an example of data in the reference waveform information storage unit 41 is described.

FIG. 6 illustrates an example of data in the reference waveform information storage unit 41 in the first embodiment. As illustrated in FIG. 6, the reference waveform information storage unit 41 stores reference azimuth angles in association with the reference vibration waveform information.

The example of FIG. 6 illustrates that when the reference azimuth angle is "0 degrees", the reference vibration waveform information is "reference waveform information for 0 degrees", and when the reference azimuth angle is "45 degrees", the reference vibration waveform information is "reference waveform information for 45 degrees". It also illustrates that when the reference azimuth angle is "90 degrees", the reference vibration waveform information is "reference waveform information for 90 degrees", and when the reference azimuth angle is "135 degrees", the reference vibration waveform information is "reference waveform information for 135 degrees". It also illustrates that when the reference azimuth angle is "180 degrees", the reference vibration waveform information is "reference waveform information for 180 degrees".

Referring back to FIG. 3, the synthesis table storage unit 42 is implemented with the flash memory 13. The synthesis table storage unit 42 stores table information for synthesizing reference waveform information in accordance with an azimuth angle θ3, which will be described below. Referring to FIG. 7, an example of data in the synthesis table storage unit 42 is described.

FIG. 7 illustrates an example of data in the synthesis table storage unit 42 in the first embodiment.

As illustrated in FIG. 7, the synthesis table storage unit 42 stores a synthesis table that associates azimuth angles to the synthesis volume of the reference vibration waveform.

In FIG. 7, the synthesis volume of the reference vibration waveform indicates volume information (%) when synthesizing the reference vibration waveform information of 0 degrees, 45 degrees, 90 degrees, 135 degrees, and 180 degrees.

For instance, when the azimuth angle is "0 degrees", synthesis is performed using the reference waveform information for 0 degrees with "100" (%), and the reference waveform information for 45 to 180 degrees with "0" (%). When the azimuth angle is "10 degrees", synthesis is performed using the reference waveform information for 0 degrees with "77.8" (%), the reference waveform information for 45 degrees with "22.2" (%), and the reference waveform information for 90 to 180 degrees with "0" (%).

Referring back to FIG. 3, the controller 10 is a functional unit implemented by the processor 11 executing a program stored in the main memory 12 or the flash memory 13, and executes various processes based on the OS (e.g., Android (registered trademark)). The controller 10 includes an input processing unit 101, a display processing unit 102, and a pen vibration control unit (pen vibration controller) 110.

The input processing unit 101 is a functional unit implemented by the processor 11. For instance, the input processing unit 101 is a device driver that controls the input through the touch sensor unit 22, and detects the position and a contact of the pen 30 on the screen DF of the display unit 21 in accordance with the input through the touch sensor unit 22. The input processing unit 101 outputs the detected positional information (positional coordinates) of the pen 30 to the OS. The input processing unit 101 also acquires the pen angle θ1 detected by the pen-angle detector 220, and outputs it to the pen vibration control unit 110 via the OS, for example.

The display processing unit 102 is a functional unit implemented by the processor 11. The display processing unit 102 causes the display unit 21 to display the movement locus of the pen 30 in accordance with the positional information of the pen 30 detected via the input processing unit 101.

The pen vibration control unit 110 is a functional unit implemented by the processor 11. The pen vibration control unit 110 generates a vibration waveform signal based on the pen angle θ1 detected by the pen-angle detector 220 and the movement direction of the pen 30 to vibrate the vibration generator 31 of the pen 30 based on the generated vibration waveform signal. The pen vibration control unit 110 generates the vibration waveform signal based on the azimuth angle θ3, which indicates the direction of movement relative to the direction indicated by the pen angle θ1. The pen vibration control unit 110 then transmits the generated vibration waveform signal to the pen 30 via the wireless communication unit 29 to vibrate the vibration generator 31. The pen vibration control unit 110 includes an azimuth angle generator 111 and a vibration waveform signal generator 112.

The azimuth angle generator 111 is a functional unit implemented by the processor 11 and generates an azimuth angle θ3 based on the pen angle θ1 detected by the pen-angle detector 220 and the angle θ2 indicating the direction of movement of the pen 30, as illustrated in FIG. 5. Specifically, the pen vibration control unit 110 generates the azimuth angle θ3 according to the equation (1) described above.

The vibration waveform signal generator 112 is a functional unit implemented by the processor 11 and generates a vibration waveform signal based on the azimuth angle θ3. The vibration waveform signal generator 112 generates a vibration waveform signal based on the reference vibration waveform information corresponding to each reference azimuth angle stored in the reference waveform information storage unit 41, and the azimuth angle θ3.

Figure 8:
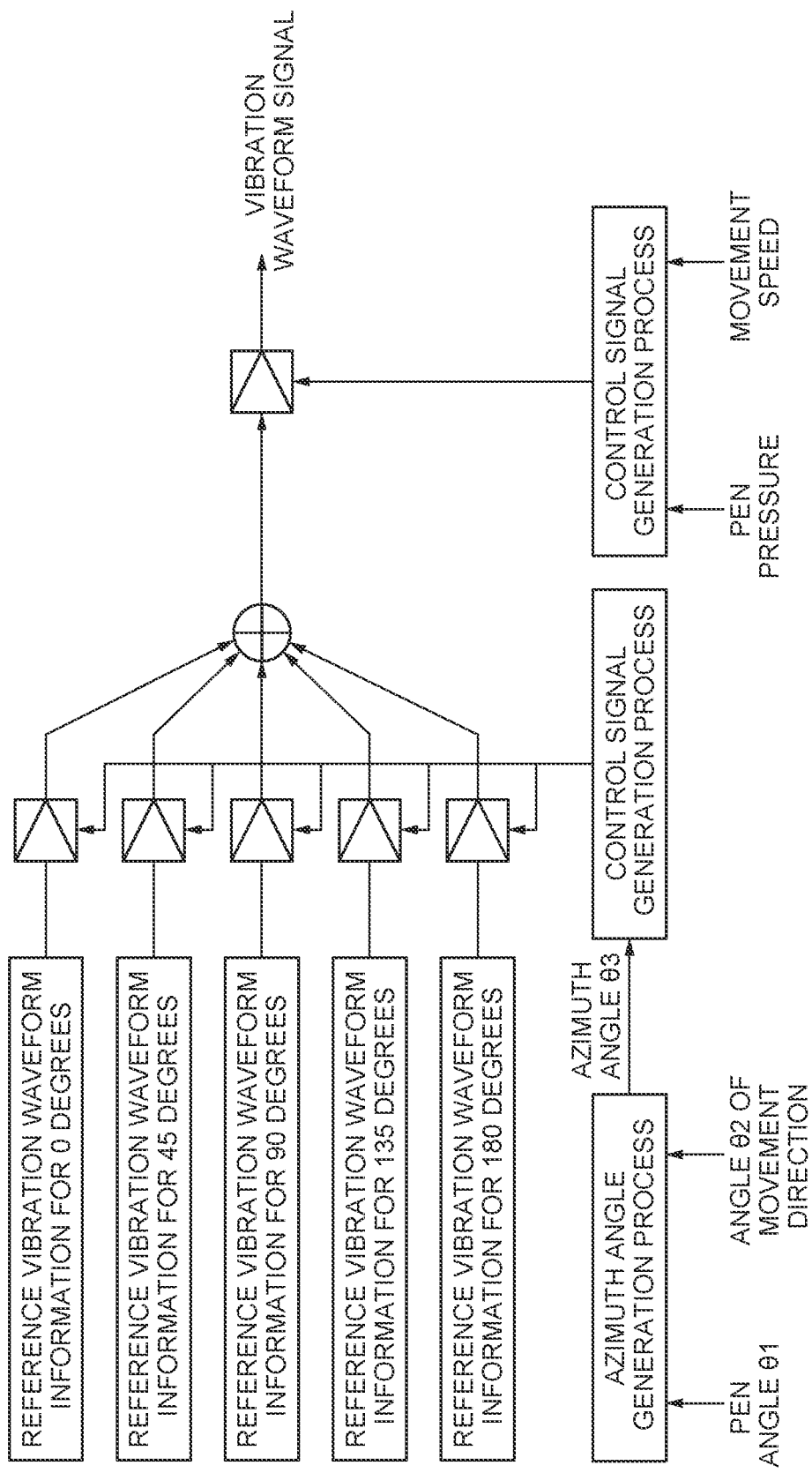
FIG. 8 describes one example of the process of generating a vibration waveform signal in the first embodiment.

Specifically, the vibration waveform signal generator 112 synthesizes plurality of pieces of reference vibration waveform information corresponding to reference azimuth angles based on the synthesis volume (%) of each reference vibration waveform corresponding to the azimuth angle θ3 obtained from the synthesis table storage unit 42 to generate a vibration waveform signal. Referring now to FIG. 8, the following describes the process of generating a vibration waveform signal according to the first embodiment in details.

FIG. 8 describes one example of the process of generating a vibration waveform signal in the first embodiment.

The following explains the process of generating a vibration waveform signal by the pen vibration control unit 110, using the equivalent circuit of the process of generating a vibration waveform signal illustrated in FIG. 8.

In FIG. 8, plurality of pieces of reference vibration waveform information for 0 degrees to reference waveform information for 180 degrees corresponds to reference azimuth angles stored in the reference waveform information storage unit 41. The azimuth angle θ3 is generated by the azimuth angle generator 111 based on the pen angle θ1 and the movement direction angle θ2. The vibration waveform signal generator 112 generates a control signal for volume based on the azimuth angle θ3. That is, the vibration waveform signal generator 112 acquires the parameters of the synthetic volume of the reference vibration waveform corresponding to the azimuth angle θ3 from the synthesis table storage unit 42, and outputs the parameters of the synthetic volume as a control signal.

For instance, when the azimuth angle θ3 is 10 degrees, the vibration waveform signal generator 112 multiplies the reference waveform information for 0 degrees by 0.778, the reference waveform information for 45 degrees by 0.222, and the other pieces of reference vibration waveform information by 0, and adds them together to synthesize each piece of the reference vibration waveform information with adjusted volume. The signal generated by the synthesis is referred to as a synthesized signal.

The vibration waveform signal generator 112 adjusts the volume of the synthesized signal in accordance with the pen pressure, which is a contact pressure of the pen 30 with the screen DF, and the movement speed of the pen 30, and outputs the vibration waveform signal. For instance, the vibration waveform signal generator 112 adjusts the volume (amplitude) so that the greater the pen pressure, the greater the volume (amplitude). The vibration waveform signal generator 112 adjusts the volume (amplitude) so that the greater the movement speed, the greater the volume (amplitude).

Thus, the vibration waveform signal generator 112 generates a vibration waveform signal based on the plurality of pieces of reference vibration waveform information corresponding to the multiple reference azimuth angles that are different predefined angles, and the azimuth angle θ3. Specifically, the vibration waveform signal generator 112 executes a synthesis process of changing the amplitude (volume) of each piece of the reference vibration waveform information (reference waveform information for 0 degrees to 180 degrees) according to the azimuth angle θ3 to generate a vibration waveform signal.

For instance, the pen control unit 50 is a functional unit implemented by the MCU 33, and transmits the vibration waveform signal received from the tablet terminal 1 via the wireless communication unit 32 to the vibration generator 31 to vibrate the pen 30.

Next referring to the drawings, the following describes the operation of the information processing system 100 according to the first embodiment.

Figure 9:
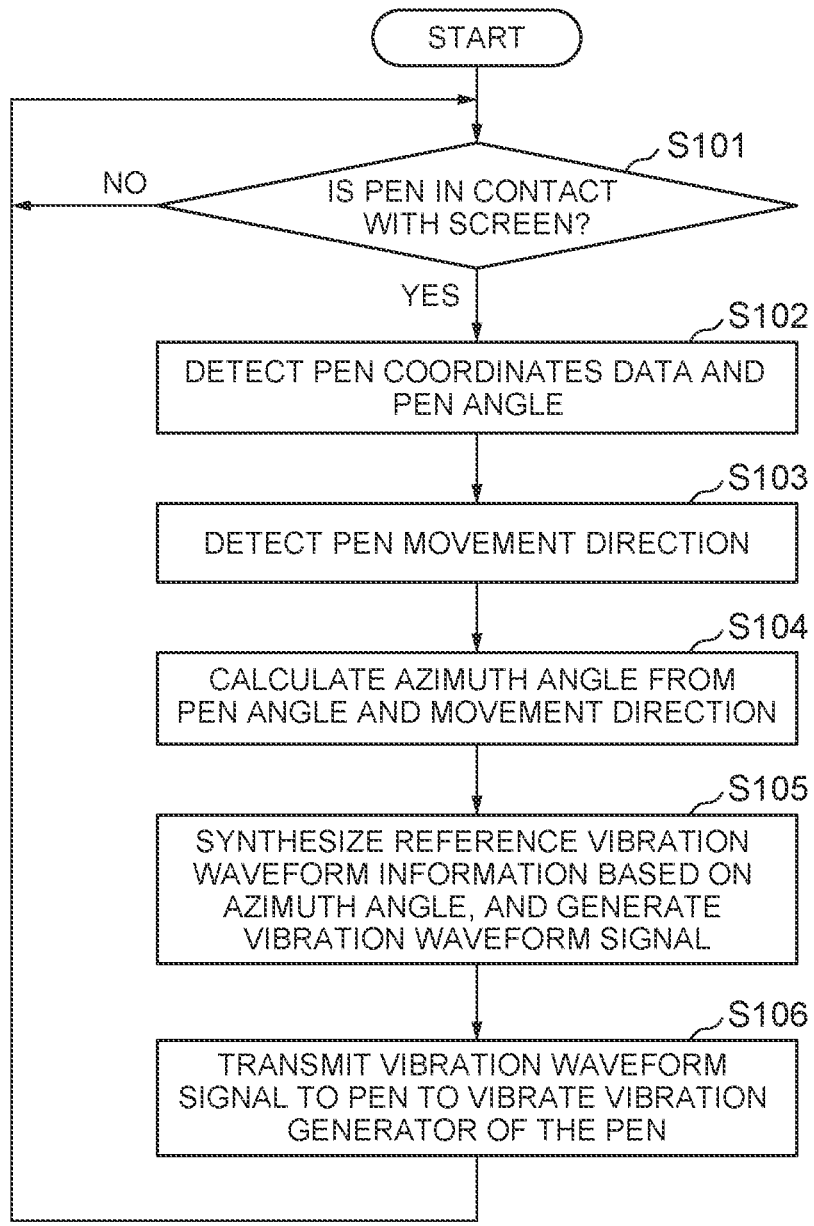
FIG. 9 is a flowchart describing an example of the operation of the tablet terminal according to the first embodiment.

FIG. 9 is a flowchart describing an example of the operation of the tablet terminal 1 according to the first embodiment.

As illustrated in FIG. 9, the tablet terminal 1 first determines whether or not the pen 30 is in contact with the screen DF (step S101). That is, the pen vibration control unit 110 of the controller 10 determines whether or not the pen 30 is in contact with the screen DF based on the detection information of the touch sensor unit 22. If the pen 30 is in contact with the screen DF (step S101: YES), the pen vibration control unit 110 advances the process to step S102. If the pen 30 is not in contact with the screen DF (step S101: NO), the pen vibration control unit 110 returns the process to step S101.

In step S102, the pen vibration control unit 110 detects the pen-coordinates data and pen angle θ1. The pen vibration control unit 110 detects the pen-coordinates data (positional coordinates of the pen 30) by the contact detector 221 and pen detector 222 via the input processing unit 101, and also detects the pen angle θ1 by the pen-angle detector 220.

Next, the pen vibration control unit 110 detects the direction of movement of the pen 30 (step S103). For instance, the pen vibration control unit 110 detects the movement direction of the pen 30 based on past pen-coordinates data and current pen-coordinates data.

Next, the pen vibration control unit 110 calculates the azimuth angle θ3 from the pen angle θ1 and the movement direction (step S104). That is, the azimuth angle generator 111 of the pen vibration control unit 110 generates the azimuth angle θ3 based on the pen angle θ1 and the angle θ2 indicating the movement direction of the pen 30, as illustrated in FIG. 5. The azimuth angle generator 111 calculates the azimuth angle θ3 using the above equation (1).

Next, the pen vibration control unit 110 synthesizes plurality of pieces of reference vibration waveform information based on the azimuth angle θ3 to generate a vibration waveform signal (step S105). The vibration waveform signal generator 112 of the pen vibration control unit 110 changes the volume of each piece of the reference vibration waveform information corresponding to a reference azimuth angle stored in the reference waveform information storage unit 41, as illustrated in FIG. 8 above, with the parameters of the synthesis volume corresponding to azimuth angle θ3 obtained from the synthesis table storage unit 42, thus generating a vibration waveform signal.

Next, the pen vibration control unit 110 transmits the vibration waveform signal to the pen 30 to vibrate the vibration generator 31 of the pen 30 (step S106). The pen vibration control unit 110 transmits the vibration waveform signal to the pen 30 via the wireless communication unit 29 to vibrate the vibration generator 31 of the pen 30. After the process of step S106, the pen vibration control unit 110 returns the process to step S101.

As described above, the information processing system 100 according to the first embodiment includes the pen 30, the display unit 21, the touch sensor unit 22, the pen-angle detector 220 (angle detector), and the pen vibration control unit 110. The pen 30 has the vibration generator 31. The touch sensor unit 22 detects the contact position of the pen 30 on the screen DF of the display unit 21. The pen-angle detector 220 detects the pen angle θ1, which indicates the direction on the screen DF in which the pen 30 in contact with the screen DF is tilted. The pen vibration control unit 110 generates a vibration waveform signal based on the pen angle θ1 detected by the pen-angle detector 220 and the movement direction of the pen 30 to vibrate the vibration generator 31 based on the generated vibration waveform signal.

With this configuration, the information processing system 100 according to the first embodiment changes the vibrations of the pen 30 according to the pen angle θ1 and movement direction of the pen 30, thereby reducing discomfort about the writing smoothness and texture during pen inputting, and realizing realistic writing smoothness and texture. Thus, the information processing system 100 according to this embodiment enhances the user experience.

The pen vibration control unit 110 of the first embodiment generates a vibration waveform signal based on the azimuth angle θ3, which indicates the direction of movement relative to the direction indicated by the pen angle θ1. With this configuration, the information processing system 100 of the first embodiment uses the azimuth angle θ3 and realizes a more realistic writing smoothness and texture.

The pen vibration control unit 110 of the first embodiment generates a vibration waveform signal based on the plurality of pieces of reference vibration waveform information corresponding to multiple reference azimuth angles (e.g., 0, 45, 90, 135, and 180 degrees) that are different predefined angles, and the azimuth angle θ3. For instance, the reference vibration waveform information is the vibration waveform information actually measured (sampled) at each reference azimuth angle.

With this configuration, the information processing system 100 of the first embodiment generates a vibration waveform signal based on the reference vibration waveform information corresponding to each of the multiple reference azimuth angles (e.g., 0, 45, 90, 135, and 180 degrees), and thus generates a more realistic vibration waveform signal in accordance with the azimuth angle θ3.

The first embodiment executes a synthesis process of changing the amplitude (e.g., volume) of each piece of the reference vibration waveform information in accordance with the azimuth angle, and thus generating a vibration waveform signal.

This allows the information processing system 100 of the first embodiment to generate a more realistic vibration waveform signal that is closer to reality through a simple method of synthesis processing that changes the amplitude (e.g., volume) of the reference vibration waveform information.

The pen vibration control unit 110 of the first embodiment may change the amplitude (e.g., volume) of a vibration waveform signal in accordance with the contact pressure of the pen 30 in contact with the screen DF and the movement speed of the pen 30. For instance, the pen vibration control unit 110 changes the amplitude (e.g., volume) of the vibration waveform signal to be higher for higher contact pressure, and changes the amplitude (e.g., volume) of the vibration waveform signal to be higher for higher movement speed.

With this configuration, the information processing system 100 according to the first embodiment changes the vibrations of the pen 30 according to the contact pressure and movement speed of the pen 30, thereby realizing more realistic writing smoothness and texture of the pen 30.

The information processing system 100 according to the first embodiment includes the tablet terminal 1 (information processing apparatus) that includes the display unit 21, the touch sensor unit 22, the pen-angle detector 220, and the pen vibration control unit 110. The tablet terminal 1 (information processing apparatus) transmits a vibration waveform signal to the pen 30, and the vibration generator 31 vibrates in accordance with the vibration waveform signal received from the tablet terminal 1 (information processing apparatus).

With this configuration, the information processing system 100 of the first embodiment causes the tablet terminal 1 to generate a vibration waveform signal based on the pen angle θ1 and the movement direction of the pen 30 and transmits the generated vibration waveform signal to the pen 30 to vibrate the vibration generator 31, thus generating the vibration waveform signal efficiently.

The tablet terminal 1 (information processing apparatus) according to the first embodiment includes the display unit 21, the touch sensor unit 22, the pen-angle detector 220 (angle detector), and the pen vibration control unit 110. The touch sensor unit 22 detects the contact position of the pen 30 having the vibration generator 31 on the screen DF of the display unit 21. The pen-angle detector 220 detects the pen angle θ1, which indicates the direction on the screen DF in which the pen 30 in contact with the screen DF is tilted. The pen vibration control unit 110 generates a vibration waveform signal based on the pen angle θ1 detected by the pen-angle detector 220 and the movement direction of the pen 30 to vibrate the vibration generator 31 based on the generated vibration waveform signal.

With this configuration, the tablet terminal 1 (information processing apparatus) according to the first embodiment has the same advantageous effects as the information processing system 100 as described above, and thus reduces discomfort about the smoothness and texture during pen inputting and enhances user experience.

A control method according to the first embodiment is to control the information processing system 100 including the pen 30 having the vibration generator 31, the display unit 21, and the touch sensor unit 22 that detects a contact position of the pen 30 on the screen DF of the display unit 21. The method includes a pen-angle detection step and a pen vibration control step. In the pen-angle detection step, the pen-angle detector 220 (angle detector) detects the pen angle θ1, which indicates the direction on the screen DF in which the pen 30 in contact with the screen DF is tilted. In the pen vibration control step, the pen vibration control unit 110 generates a vibration waveform signal based on the pen angle θ1 detected by the pen-angle detector 220 and the movement direction of the pen 30 to vibrate the vibration generator 31 based on the generated vibration waveform signal.

With this configuration, the control method according to the first embodiment has the same advantageous effects as the information processing system 100 and the tablet terminal 1 as described above, and thus reduces discomfort about the smoothness and texture during pen writing and enhances user experience.

Second Embodiment

Referring to the drawings, the following describes an information processing system 100a and a tablet terminal 1a according to a second embodiment.

This embodiment describes a modified example, in which the generation process of a vibration waveform signal is different. The information processing system 100a according to the second embodiment generates a vibration waveform signal by adaptive filtering.

Figure 10:
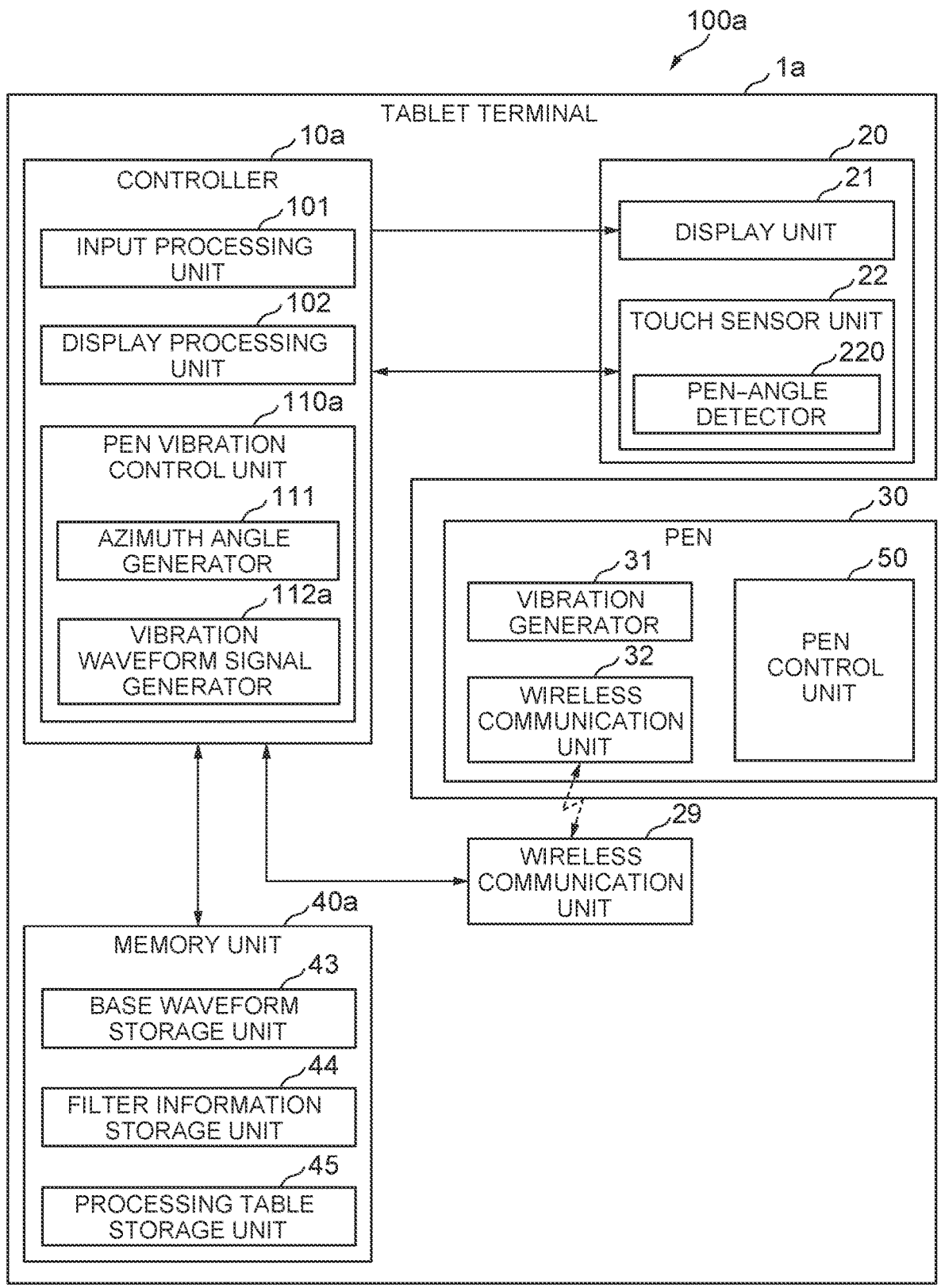
FIG. 10 is a block diagram illustrating one example of the functional configuration of the information processing system according to a second embodiment.

FIG. 10 is a block diagram illustrating one example of the functional configuration of the information processing system 100a according to the second embodiment.

As illustrated in FIG. 10, the information processing system 100a includes the tablet terminal 1a and a pen 30, and the tablet terminal 1a includes a controller 10a, a touch screen 20, a memory unit 40a, and a wireless communication unit 29.

The information processing system 100a according to the second embodiment has the external view and hardware configuration similar to those of the first embodiment in FIGS. 1 and 2 above, so the description is omitted here. In FIG. 10, like numerals indicate like components in FIG. 3 as described above, and their description will be omitted.

The memory unit 40a is implemented with the main memory 12 or the flash memory 13, for example, and includes a base waveform storage unit 43, a filter information storage unit 44, and a processing table storage unit 45.

The base waveform storage unit 43 is implemented with the flash memory 13 and stores a base waveform signal used to generate a vibration waveform signal of this embodiment. In this embodiment, a vibration waveform signal is generated by performing filtering of the base waveform signal.

The filter information storage unit 44 is implemented with the flash memory 13, and stores filter information corresponding to each of a plurality of reference azimuth angles (e.g., 0, 45, 90, 135, and 180 degrees) that are preset different angles.

The filter information is to reproduce an actual vibration waveform with a real writing tool (e.g., pen) and paper at the reference azimuth angles, and is a coefficient parameter of each frequency component and a set of filter coefficients, for example. The filter information is obtained by actually sampling the vibration waveforms of a real writing tool (e.g., pen) and paper at the reference azimuth angles, and then analyzing them (e.g., frequency analysis).

Figures 11, 12:
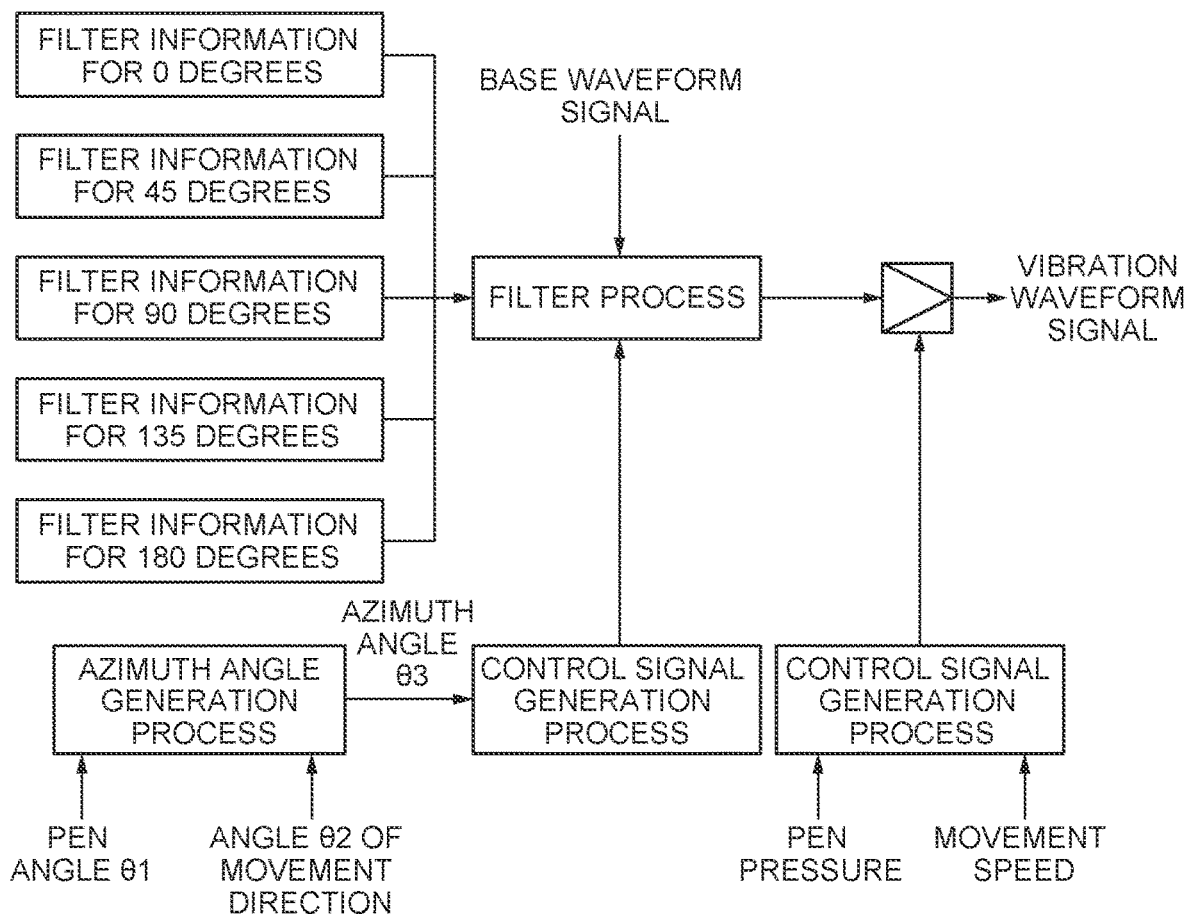
FIG. 11 illustrates an example of data in a filter information storage unit in the second embodiment.
FIG. 12 describes one example of the process of generating a vibration waveform signal in the second embodiment.

The filter information storage unit 44 stores the reference azimuth angles in association with the filter information. Referring to FIG. 11, an example of data in the filter information storage unit 44 is described.

FIG. 11 illustrates an example of data in the filter information storage unit 44 in the second embodiment. As illustrated in FIG. 11, the filter information storage unit 44 stores the reference azimuth angles in association with the filter information.

The example of FIG. 11 illustrates that when the reference azimuth angle is "0 degrees", the filter information is "filter information for 0 degrees", and when the reference azimuth angle is "45 degrees", the filter information is "filter information for 45 degrees". It also illustrates that when the reference azimuth angle is "90 degrees", the filter information is "filter information for 90 degrees", and when the reference azimuth angle is "135 degrees", the filter information is "filter information for 135 degrees". It also illustrates that when the reference azimuth angle is "180 degrees", the filter information is "filter information for 180 degrees".

Referring back to FIG. 10, the processing table storage unit 45 is implemented with the flash memory 13. The processing table storage unit 45 stores table information for adapted filter information corresponding to the azimuth angle $\theta 3$. Similar to the synthesis table storage unit 42 in FIG. 7, the processing table storage unit 45 stores information on the usage percentage of filter information for each reference azimuth angle according to the azimuth angle $\theta 3$.

For instance, the controller 10a is a functional unit implemented by the processor 11 executing a program stored in the main memory 12 or the flash memory 13, and executes various processes based on the OS (e.g., Android (registered trademark)). The controller 10a includes an input processing unit 101, a display processing unit 102, and a pen vibration control unit (pen vibration controller) 110a.

The pen vibration control unit 110a is a functional unit implemented by the processor 11. The pen vibration control unit 110a generates a vibration waveform signal based on the pen angle $\theta 1$ detected by the pen-angle detector 220 and the movement direction of the pen 30 to vibrate the vibration generator 31 of the pen 30 based on the generated vibration waveform signal. The pen vibration control unit 110a includes an azimuth angle generator 111 and a vibration waveform signal generator 112a.

The vibration waveform signal generator 112a is a functional unit implemented by the processor 11 and generates a vibration waveform signal based on the azimuth angle $\theta 3$. The vibration waveform signal generator 112a generates a vibration waveform signal based on the base waveform signal stored in the base waveform storage unit 43, the filter information corresponding to each reference azimuth angle stored in the filter information storage unit 44, and the azimuth angle $\theta 3$.

Specifically, the vibration waveform signal generator 112a performs filtering (adaptive filter processing) of a base waveform signal with the filter information corresponding to each reference azimuth angle, based on the filter information corresponding to each reference azimuth angle and the percentage information of each piece of filter information corresponding to the azimuth angle $\theta 3$ obtained from the processing table storage unit 45 to generate a vibration waveform signal. Referring now to FIG. 12, the following describes the process of generating a vibration waveform signal according to the second embodiment in details.

FIG. 12 describes one example of the process of generating a vibration waveform signal in the second embodiment.

The following explains the process of generating a vibration waveform signal by the pen vibration control unit 110a, using the equivalent circuit of the process of generating a vibration waveform signal illustrated in FIG. 12.

In FIG. 12, plurality of pieces of filter information for 0 degrees to filter information for 180 degrees corresponds to reference azimuth angles stored in the filter information storage unit 44. The azimuth angle $\theta 3$ is generated by the azimuth angle generator 111 based on the pen angle $\theta 1$ and the angle $\theta 2$ of movement direction. The vibration waveform signal generator 112a generates a control signal of filtering for each reference azimuth angle based on the azimuth angle $\theta 3$. That is, the vibration waveform signal generator 112a acquires parameters of the percentage information on each piece of filter information corresponding to the azimuth angle $\theta 3$ from the processing table storage unit 45, and outputs the parameters of the percentage information on each piece of filter information as a control signal.

The vibration waveform signal generator 112a selectively executes filtering based on the parameters of the percentage information of each piece of filter information corresponding to the azimuth angle $\theta 3$ to generate the waveform signal subjected to filtering.

The vibration waveform signal generator 112a adjusts the volume of the waveform signal subjected to filtering in accordance with the pen pressure, which is a contact pressure of the pen 30 with the screen DF, and the movement speed of the pen 30, and outputs a vibration waveform signal. For instance, the vibration waveform signal generator 112a adjusts the volume (amplitude) so that the greater the pen pressure, the greater the volume (amplitude). The vibration waveform signal generator 112a adjusts the volume (amplitude) so that the greater the movement speed, the greater the volume (amplitude).

Thus, the vibration waveform signal generator 112a performs filtering of a base waveform signal, which is the basis of a vibration waveform signal, based on a set of filter coefficients (filter information) corresponding to each of multiple reference azimuth angles that are preset different angles and the azimuth angle θ3, thus generating a vibration waveform signal. Specifically, the vibration waveform signal generator 112a executes filtering while changing the percentage of each piece of the filter information (filter information for 0 degrees to 180 degrees) according to the azimuth angle θ3 to generate a vibration waveform signal.

Next referring to the drawings, the following describes the operation of the information processing system 100a according to the second embodiment.

Figure 13:
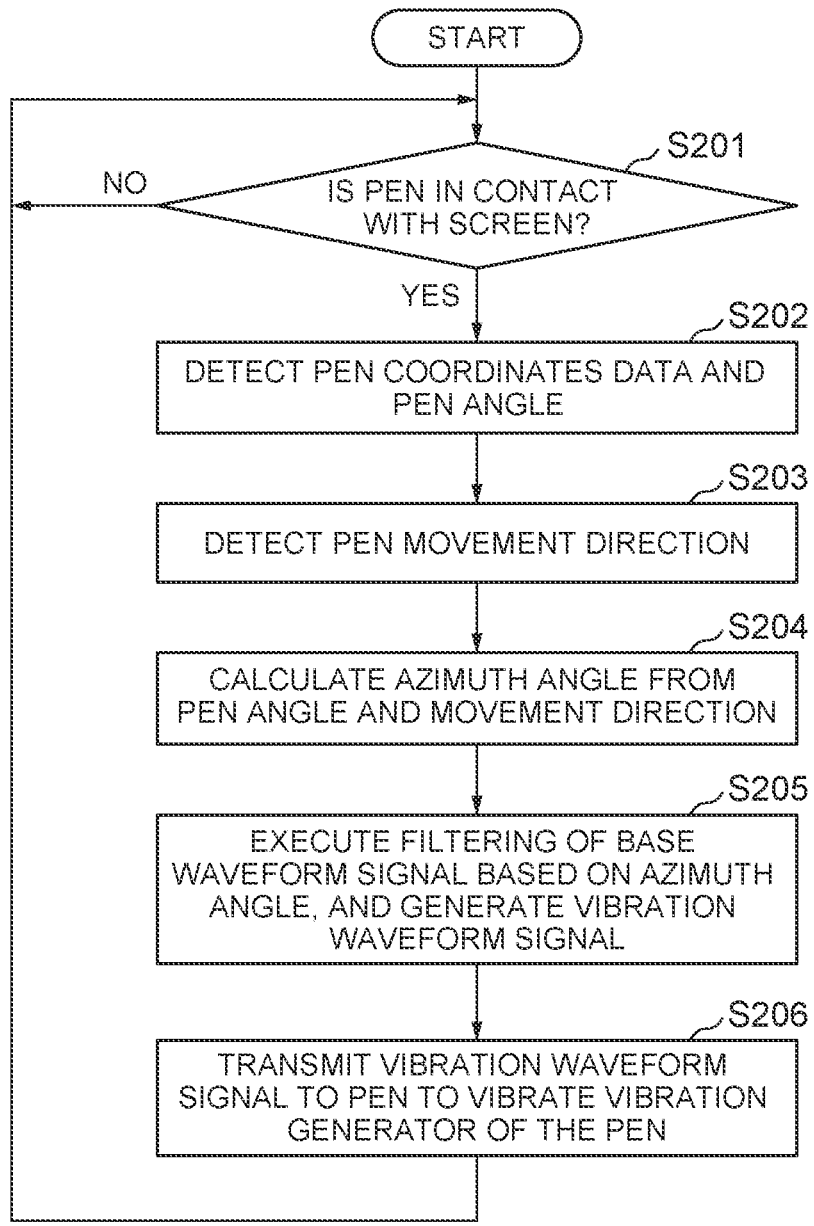
FIG. 13 is a flowchart describing an example of the operation of the tablet terminal according to the second embodiment.

FIG. 13 is a flowchart describing an example of the operation of the tablet terminal 1a according to the second embodiment.

In FIG. 13, the processing from step S201 to step S204 is the same as the processing from step S101 to step S104 in FIG. 9 described above, and the description thereof will be omitted here.

In step S205, the pen vibration control unit 110a performs filtering of the base waveform signal based on the azimuth angle θ3 to generate a vibration waveform signal. As illustrated in FIG. 12 above, the vibration waveform signal generator 112a of the pen vibration control unit 110a performs filtering of a base wave signal with filter information (a set of filter coefficients) corresponding to each of multiple reference azimuth angles stored in the filter information storage unit 44 and the parameters of the filtering percentage corresponding to the azimuth angle θ3 obtained from the processing table storage unit 45, thus generating a vibration waveform signal.

Next, the pen vibration control unit 110a transmits the vibration waveform signal to the pen 30 to vibrate the vibration generator 31 of the pen 30 (step S206). After the process of step S206, the pen vibration control unit 110a returns the process to step S201.

As described above, the information processing system 100a according to the second embodiment includes the pen 30, the display unit 21, the touch sensor unit 22, the pen-angle detector 220 (angle detector), and the pen vibration control unit 110a. The pen vibration control unit 110a performs filtering of the base waveform signal, which is the basis of a vibration waveform signal, based on a set of filter coefficients corresponding to each of multiple reference azimuth angles that are preset different angles and the azimuth angle θ3, thus generating a vibration waveform signal.

With this configuration, the information processing system 100a according to the second embodiment has the same advantageous effects as the first embodiment as described above, and thus reduces discomfort about the smoothness and texture during pen inputting and enhances user experience.

Third Embodiment

Referring to the drawings, the following describes an information processing system 100b and a tablet terminal 1b according to a third embodiment.

This embodiment describes a modified example, in which the generation process of a vibration waveform signal is different. The information processing system 100b according to the third embodiment generates a vibration waveform signal by volume adjustment of a base waveform signal.

Figure 14:
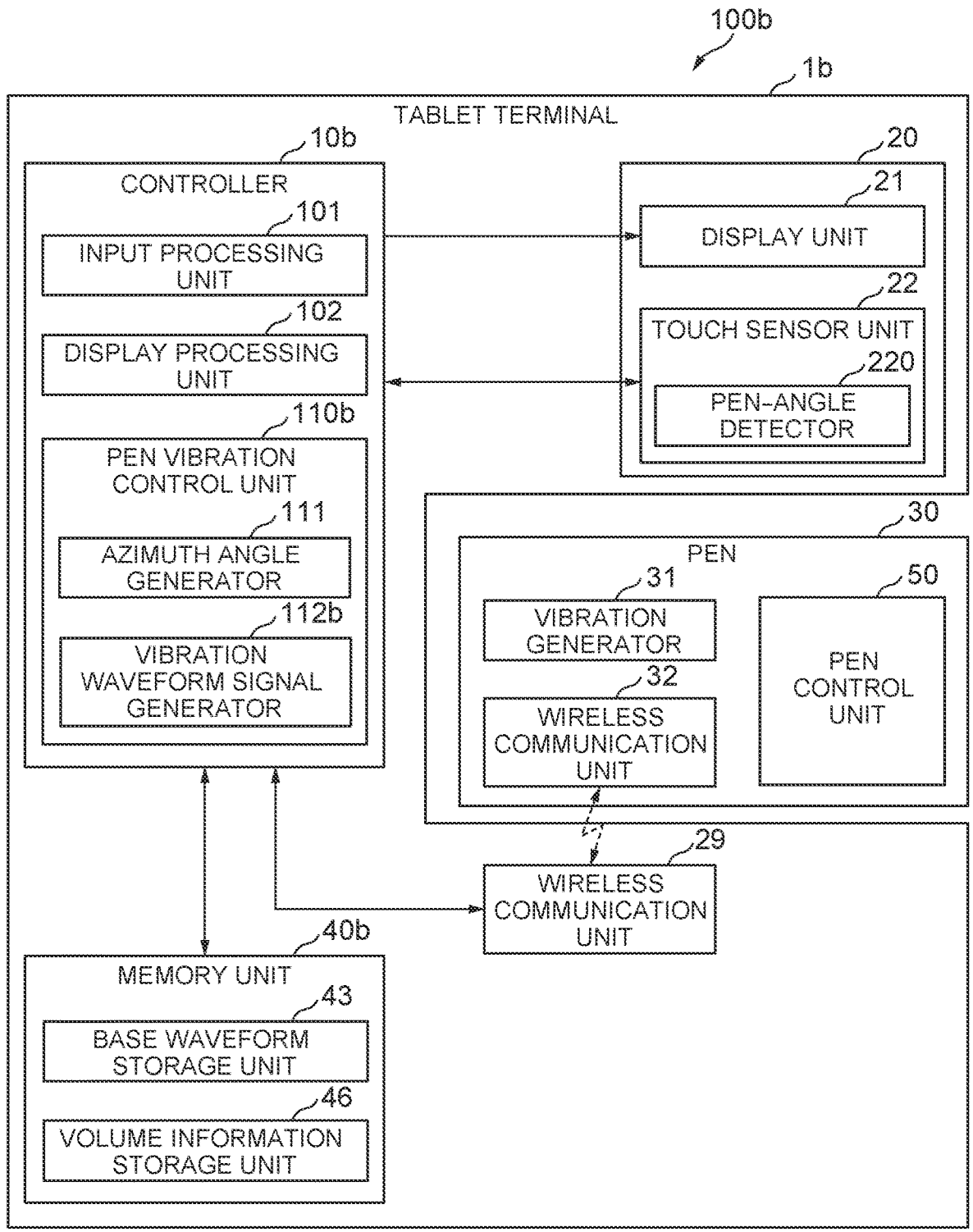
FIG. 14 is a block diagram illustrating one example of the functional configuration of the information processing system according to a third embodiment.

FIG. 14 is a block diagram illustrating one example of the functional configuration of the information processing system 100b according to the third embodiment.

As illustrated in FIG. 14, the information processing system 100b includes the tablet terminal 1b and a pen 30, and the tablet terminal 1b includes a controller 10b, a touch screen 20, a memory unit 40b, and a wireless communication unit 29.

The information processing system 100b according to the third embodiment has the external view and hardware configuration similar to those of the first embodiment in FIGS. 1 and 2 above, so the description is omitted here. In FIG. 14, like numerals indicate like components in FIG. 3 as described above, and their description will be omitted.

The memory unit 40b is implemented with the main memory 12 or the flash memory 13, for example, and includes a base waveform storage unit 43, and a volume information storage unit 46.

The volume information storage unit 46 is implemented with the flash memory 13 and stores information for changing the amplitude (volume) of the base waveform signal according to the azimuth angle θ3. For instance, the volume information storage unit 46 stores azimuth angles θ3 in association with the volume information. Here, the volume information is an example of information for changing the amplitude (volume) of a base waveform signal. The volume information is set so that the smaller the azimuth angle θ3, the smaller the amplitude, and the larger the azimuth angle θ3, the larger the amplitude.

For instance, the controller 10b is a functional unit implemented by the processor 11 executing a program stored in the main memory 12 or the flash memory 13, and executes various processes based on the OS (e.g., Android (registered trademark)). The controller 10b includes an input processing unit 101, a display processing unit 102, and a pen vibration control unit (pen vibration controller) 110b.

The pen vibration control unit 110b is a functional unit implemented by the processor 11. The pen vibration control unit 110b generates a vibration waveform signal based on the pen angle θ1 detected by the pen-angle detector 220 and the movement direction of the pen 30 to vibrate the vibration generator 31 of the pen 30 based on the generated vibration waveform signal. The pen vibration control unit 110b includes an azimuth angle generator 111 and a vibration waveform signal generator 112b.

The vibration waveform signal generator 112b is a functional unit implemented by the processor 11 and generates a vibration waveform signal based on the azimuth angle θ3. The vibration waveform signal generator 112b generates a vibration waveform signal based on a base waveform signal stored in the base waveform storage unit 43, volume information stored in the volume information storage unit 46, and the azimuth angle θ3.

Figure 15:
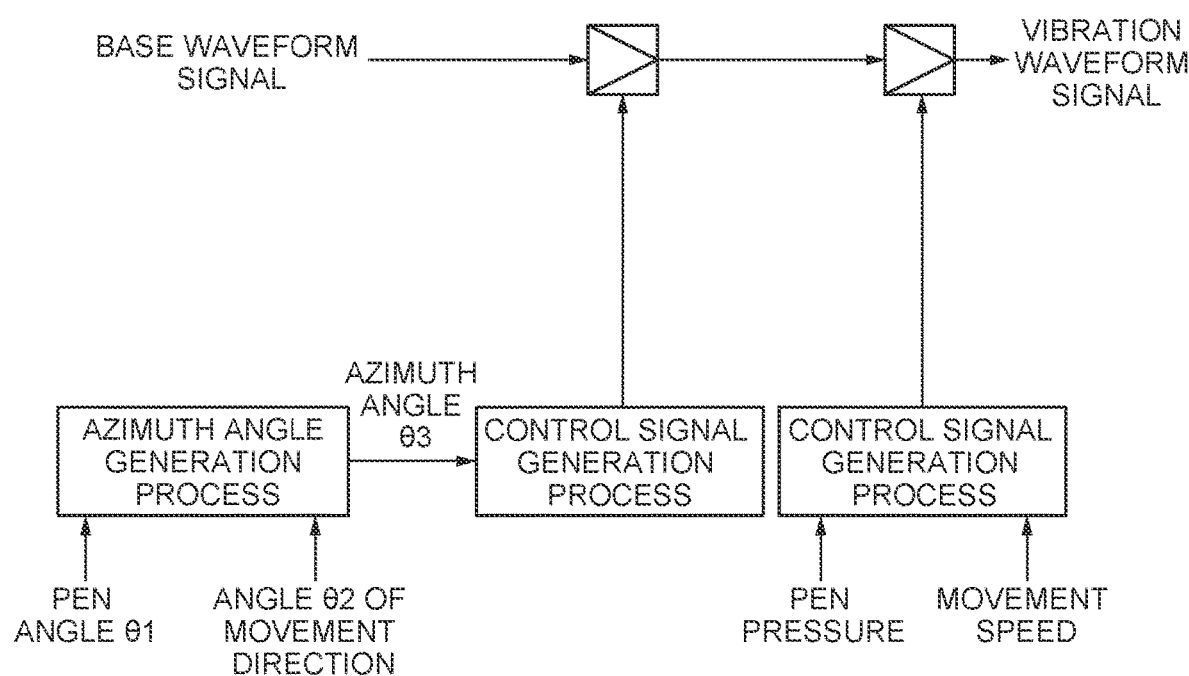
FIG. 15 describes one example of the process of generating a vibration waveform signal in the third embodiment.

Specifically, the vibration waveform signal generator 112b acquires volume information corresponding to the azimuth angle θ3 from the volume information storage unit 46, and changes the amplitude of the base waveform signal with the volume information to generate a vibration waveform signal. Referring now to FIG. 15, the following describes the process of generating a vibration waveform signal according to the third embodiment in details.

FIG. 15 describes one example of the process of generating a vibration waveform signal in the third embodiment.

The following explains the process of generating a vibration waveform signal by the pen vibration control unit 110b, using the equivalent circuit of the process of generating a vibration waveform signal illustrated in FIG. 15.

In FIG. 15, the azimuth angle θ3 is generated by the azimuth angle generator 111 based on the pen angle θ1 and the movement direction angle θ2. The vibration waveform signal generator 112b generates a control signal for volume corresponding to the azimuth angle θ3. That is, the vibration waveform signal generator 112b acquires the volume information corresponding to the azimuth angle θ3 from the volume information storage unit 46, and outputs it as a control signal.

The vibration waveform signal generator 112b changes the volume (amplitude) of the base waveform signal in accordance with the volume information corresponding to the azimuth angle θ3. The vibration waveform signal generator 112b in this embodiment adjusts the volume (amplitude) so that the greater the azimuth angle θ3, the greater the volume (amplitude).

The vibration waveform signal generator 112b also adjusts the volume (amplitude) of the base waveform signal subjected to the volume (amplitude) change based on the azimuth angle θ3, in accordance with the pen pressure, which is a contact pressure of the pen 30 with the screen DF, and the movement speed of the pen 30, and outputs a vibration waveform signal. For instance, the vibration waveform signal generator 112b adjusts the volume (amplitude) so that the greater the pen pressure, the greater the volume (amplitude). For instance, the vibration waveform signal generator 112b adjusts the volume (amplitude) so that the greater the movement speed, the greater the volume (amplitude).

Thus, the vibration waveform signal generator 112b changes the amplitude of the base waveform signal, which is the basis of the vibration waveform signal, in accordance with the azimuth angle θ3, and thus generates a vibration waveform signal.

Next referring to the drawings, the following describes the operation of the information processing system 100b according to the third embodiment.

Figure 16:
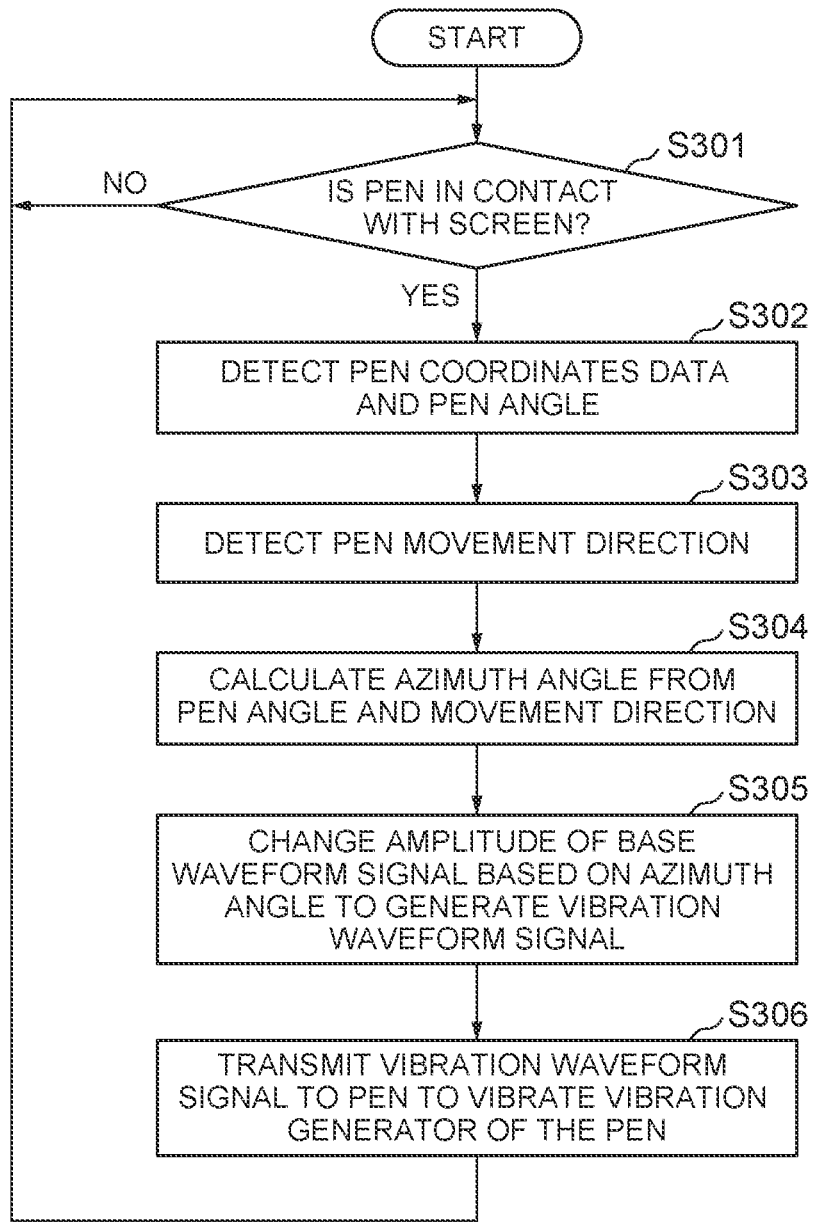
FIG. 16 describes one example of the process of generating a vibration waveform signal in the third embodiment.

FIG. 16 is a flowchart describing an example of the operation of the tablet terminal 1b according to the third embodiment.

In FIG. 16, the processing from step S301 to step S304 is the same as the processing from step S101 to step S104 in FIG. 9 described above, and the description thereof will be omitted here.

In step S305, the pen vibration control unit 110b changes the amplitude of the base waveform signal based on the azimuth angle θ3 to generate a vibration waveform signal. The vibration waveform signal generator 112b of the pen vibration control unit 110b changes the amplitude (volume) of the base waveform signal based on the volume information corresponding to the azimuth angles θ3 stored in the volume information storage unit 46, as illustrated in FIG. 15 above, thus generating a vibration waveform signal.

Next, the pen vibration control unit 110b transmits the vibration waveform signal to the pen 30 to vibrate the vibration generator 31 of the pen 30 (step S306). After the process of step S306, the pen vibration control unit 110b returns the process to step S301.

As described above, the information processing system 100b according to the third embodiment includes the pen 30, the display unit 21, the touch sensor unit 22, the pen-angle detector 220 (angle detector), and the pen vibration control unit 110b. The pen vibration control unit 110b changes the amplitude of the base waveform signal, which is the basis of the vibration waveform signal, in accordance with the azimuth angle θ3, and thus generates a vibration waveform signal.

With this configuration, the information processing system 100b according to the third embodiment has the same advantageous effects as the first embodiment as described above, and thus reduces discomfort about the smoothness and texture during pen writing and enhances user experience. The information processing system 100b according to the third embodiment uses the simple method of changing the amplitude of the base waveform signal, and thus appropriately reduces the discomfort about writing smoothness and texture during pen inputting.

Fourth Embodiment

Referring to the drawings, the following describes an information processing system 100c and a tablet terminal 1c according to a fourth embodiment.

This embodiment describes a modified example, in which a pen 30a executes the generation process of a vibration waveform signal. In other words, the information processing system 100c of this embodiment is configured so that the pen 30a, instead of the tablet terminal 1c, generates a vibration waveform signal.

Figure 17:
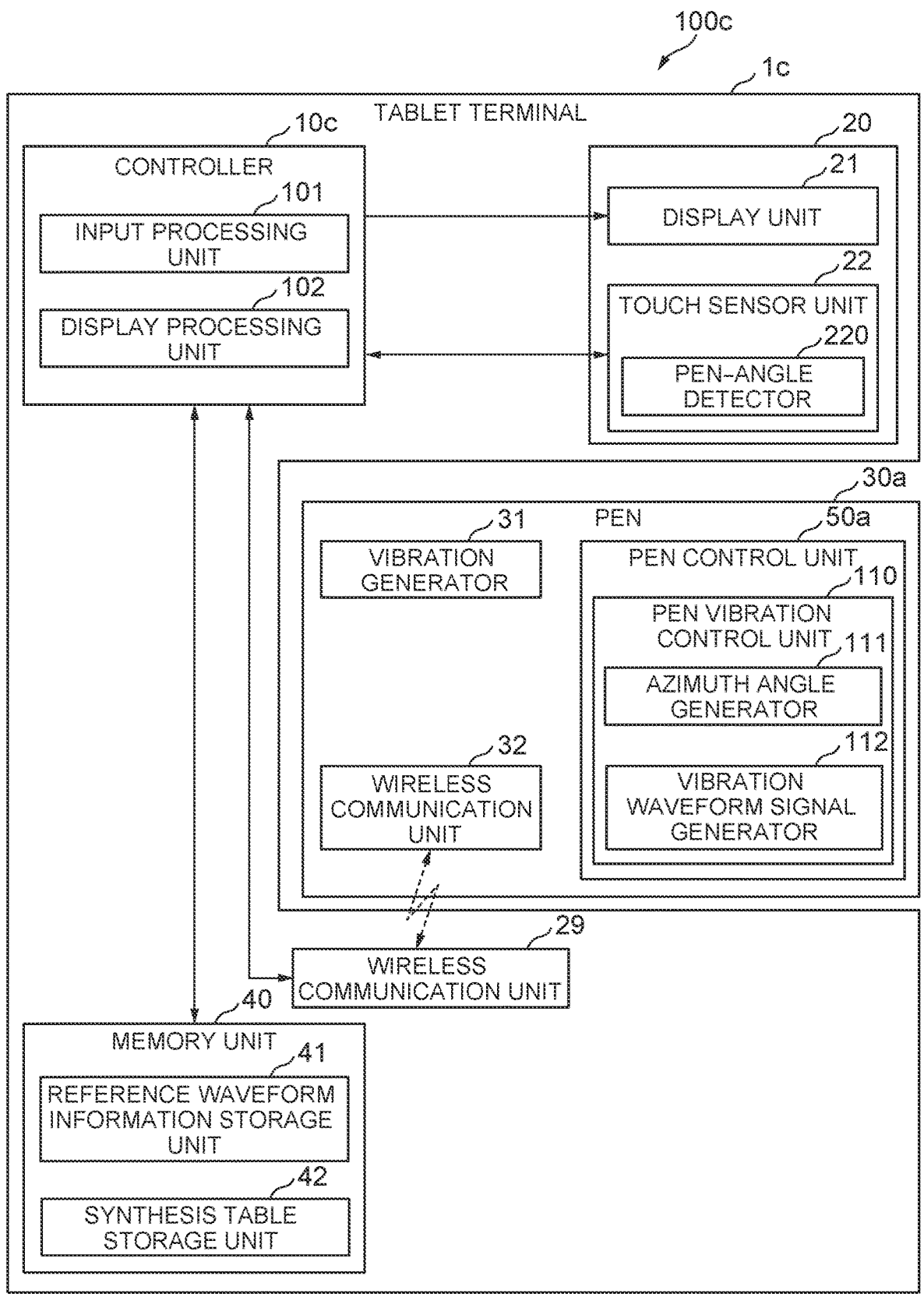
FIG. 17 is a block diagram illustrating one example of the functional configuration of the information processing system according to a fourth embodiment.

FIG. 17 is a block diagram illustrating one example of the functional configuration of the information processing system 100c according to the fourth embodiment.

As illustrated in FIG. 17, the information processing system 100c includes the tablet terminal 1c and a pen 30a, and the tablet terminal 1c includes a controller 10c, a touch screen 20, a memory unit 40, and a wireless communication unit 29. The pen 30a includes a vibration generator 31, a wireless communication unit 32, and a pen control unit 50a.

The information processing system 100c according to the fourth embodiment has the external view and hardware configuration similar to those of the first embodiment in FIGS. 1 and 2 above, so the description is omitted here. In FIG. 17, like numerals indicate like components in FIG. 3 as described above, and their description will be omitted.

For instance, the controller 10c is a functional unit implemented by the processor 11 executing a program stored in the main memory 12 or the flash memory 13, and executes various processes based on the OS (e.g., Android (registered trademark)). The controller 10c does not include a pen vibration control unit (pen vibration controller) 110, and includes an input processing unit 101, and a display processing unit 102.

For instance, the pen control unit 50a is a functional unit implemented by the MCU 33, and includes a pen vibration control unit (pen vibration controller) 110 instead of the controller 10c. The pen vibration control unit 110 includes an azimuth angle generator 111 and a vibration waveform signal generator 112.

The process at the pen vibration control unit 110, the azimuth angle generator 111, and the vibration waveform signal generator 112 is the same as that in the first embodiment, and the description thereon will be omitted here. In this embodiment, the tablet terminal 1c (controller 10c) transmits a pen angle θ1 and a movement direction of the pen 30a to the pen 30a via the wireless communication unit 29.

The pen vibration control unit 110 of the pen 30a (pen control unit 50a) generates a vibration waveform signal based on the pen angle θ1 and a movement direction of the pen 30a received from the tablet terminal 1c via the wireless communication unit 32. When generating the vibration waveform signal, the pen vibration control unit 110 acquires the information stored in the reference waveform information storage unit 41 and the synthesis table storage unit 42 from the tablet terminal 1c (controller 10c) via the wireless communication unit 32.

The pen control unit 50a then transmits the generated vibration waveform signal to the vibration generator 31 to vibrate the pen 30.

As described above, the information processing system 100c according to the fourth embodiment includes the tablet terminal 1c (information processing apparatus) and the pen 30a. The tablet terminal 1c includes the display unit 21, the touch sensor unit 22, and the pen-angle detector 220. The pen 30a includes the vibration generator 31 and the pen vibration control unit 110. The tablet terminal 1c transmits a pen angle θ1 and a movement direction of the pen 30a to the pen 30a. The pen vibration control unit 110 generates a vibration waveform signal based on the pen angle θ1 and a movement direction of the pen 30a received from the tablet terminal 1c.

With this configuration, the information processing system 100c according to the fourth embodiment has the same advantageous effects as the first embodiment as described above, and thus reduces discomfort about the smoothness and texture during pen inputting and enhances user experience. The information processing system 100c of this embodiment is configured so that the pen 30a generates a vibration waveform signal, and thus reduces the processing load on the tablet terminal 1c.

The present invention is not limited to the above-described embodiments, and can be modified without deviating from the scope of the present invention.

For instance, the above embodiments describe the example where the information processing apparatus is the tablet terminal 1 (1a, 1b, and 1c), and the present invention is not limited to this example. The information processing apparatus may be other apparatuses, such as a smartphone, and a laptop personal computer being operable in a tablet mode.

The above embodiments describe the example where Android (registered trademark) is used as one example of the OS. The present invention is not limited to this. Other OSs such as iOS (registered trademark) may be used.

The above embodiments describe the example where the pen angle θ1 is the angle of the direction on the screen DF in which the pen 30 (30a) in contact with the screen DF is tilted, and the present invention is not limited to this. The pen vibration control unit 110 (110a, 110b) may use the elevation angle of the pen 30 (30a) for the generation process of a vibration waveform signal.

The above embodiments describe the example where the pen vibration control unit 110 (110a, 110b) uses digital signal processing with software processing to generate a vibration waveform signal, and the present invention is not limited to this, and the process may be implemented using analog circuits.

In the first and second embodiments above, the reference vibration waveform information and filter information correspond to five reference azimuth angles of 0, 45, 90, 135, and 180 degrees. The present invention is not limited to this and multiple reference azimuth angles other than these five angles may be used.

In the first and fourth embodiments above, a plurality of pieces of reference vibration waveform information may be prepared in accordance with a combination of different types of writing tools (e.g., pens, pencils, etc.) and different types of paper, and may be selected for use. This allows the information processing system 100 to achieve even more realistic writing smoothness and texture depending on the combination of writing tools and paper.

In the second embodiment above, a plurality of pieces of filter information may be prepared in accordance with a combination of different types of writing tools (e.g., pens, pencils, etc.) and different types of paper, and may be selected for use. This allows the information processing system 100a to achieve even more realistic writing smoothness and texture depending on the combination of writing tools and paper.

In the second and third embodiments above, a plurality of pieces of base waveform information may be prepared in accordance with a combination of different types of writing tools (e.g., pens, pencils, etc.) and different types of paper.

In the above fourth embodiment, an example of the application to the first embodiment is described. This embodiment may also be applied to the second and third embodiments.

In the above-described fourth embodiment, the pen 30a may include part or all of the storage unit 40.

In the above-described fourth embodiment, the pen 30a may include part of the pen vibration control unit 110.

The above-stated information processing system 100 (100a, 100b, and 100c) internally includes a computer system. A program to implement the functions of various configurations of the information processing system 100 (100a, 100b, and 100c) as stated above may be stored in a computer-readable recording medium, and the processing at the various configurations of the information processing system 100 (100a, 100b, and 100c) may be performed by causing the computer system to read and execute the program stored in this recording medium. "Causing the computer system to read and execute the program stored in the recording medium" includes installing of such a program in the computer system. The "computer system" here includes an OS and hardware, such as peripherals.

The "computer system" may include a plurality of computers connected via a network, including the internet and communication lines such as WAN, LAN and dedicated lines. The "computer readable recording medium" is a portable medium, such as flexible disk, a magneto-optical disc, a ROM, or a CD-ROM, as well as a memory internally stored in the computer system, such as hard disk. In this way, the recording medium to store the program may be a non-transient recording medium, such as a CD-ROM.

The recording medium also includes an internal or external recording medium where a distribution server can access to distribute the program. The program may be divided into a plurality of pieces. After these pieces of program may be downloaded at different timings, they may be combined by the configurations of the information processing system 100 (100a, 100b, and 100c). Different distribution servers may distribute these divided pieces of program. The "computer readable recording medium" also includes the one that can hold a program for a certain period of time, as in a server that receives a program transmitted via a network or a volatile memory (RAM) in the computer system as the client. The program may implement a part of the functions as stated above. The program may be a differential file (differential program) that can implement the above functions by combining it with a program which is already stored in the computer system.

A part or all of the functions as stated above may be implemented as an integrated circuit, such as a LSI (Large Scale Integration). Each of the functions as stated above may be implemented as one processor, or a part or all of the functions may be implemented as one processor in an integrated manner. A technique for integrated circuit is not limited to a LSI, and an integrated circuit may be realized using a dedicated circuit or a general-purpose processor. If a technique for integrated circuit that replaces LSIs becomes available with the development of semiconductor techniques, an integrated circuit based on such a technique may be used.

DESCRIPTION OF SYMBOLS 1 tablet terminal
10 controller
11 processor
12 main memory
13 flash memory
20 touch screen
21 display unit
22 touch sensor unit
23 peripheral device
24 audio system
25 microphone
26 speaker
27 baseband chip
28 wireless unit
29, 32 wireless communication unit
30 pen
31 vibration generator
33 MCU
40, 40a, 40b memory unit
41 reference waveform information storage unit
42 synthesis table storage unit
43 base waveform storage unit
44 filter information storage unit
45 processing table storage unit
46 volume information storage unit
50 pen control unit
101 input processing unit
102 display processing unit
110 pen vibration control unit
111 azimuth angle generator
112, 112a, 112b vibration waveform signal generator
220 pen-angle detector
221 contact detector
222 pen detector
LC1 resonant circuit

What is claimed:

1. An information processing system comprising:
a pen having a vibration generator;
a display with a screen;
a touch sensor configured to detect a contact position of the pen on the screen of the display;
an angle detector configured to detect a pen angle, which indicates a direction on the screen in which the pen in contact with the screen is tilted; and
a pen vibration controller configured to generate a vibration waveform signal based on the pen angle detected by the angle detector and a movement direction of the pen to vibrate the vibration generator based on the generated vibration waveform signal,
wherein the pen vibration controller is configured to generate the vibration waveform signal based on an azimuth angle, which indicates the movement direction relative to a direction indicated by the pen angle, and
wherein the pen vibration controller is configured to generate the vibration waveform signal based on reference vibration waveform information corresponding to each of a plurality of reference azimuth angles that are different predefined angles, and the azimuth angle.

2. The information processing system according to claim 1, wherein the pen vibration controller is configured to execute synthesis process of changing an amplitude of each piece of the reference vibration waveform information in accordance with the azimuth angle, and thus generate the vibration waveform signal.

3. The information processing system according to claim 1, wherein the pen vibration controller is configured to perform filtering of a base waveform signal, which is a basis of the vibration waveform signal, based on a set of filter coefficients corresponding to each of a plurality of reference azimuth angles that are preset different angles, and the azimuth angle, and thus generate the vibration waveform signal.

4. The information processing system according to claim 1, wherein the pen vibration controller is configured to change an amplitude of a base waveform signal, which is a basis of the vibration waveform signal, according to the azimuth angle, and thus generate the vibration waveform signal.

5. The information processing system according to claim 2, wherein the pen vibration controller is configured to change an amplitude of the vibration waveform signal in accordance with a contact pressure of the pen in contact with the screen and a movement speed of the pen.

6. The information processing system according to claim 2 comprising an information processing apparatus including the display, the touch sensor, the angle detector, and the pen vibration controller,
the information processing apparatus transmitting the vibration waveform signal to the pen,
the vibration generator vibrating in accordance with the vibration waveform signal received from the information processing apparatus.

7. The information processing system according to claim 2, comprising an information processing apparatus including the display, the touch sensor, and the angle detector, the pen including the vibration generator and the pen vibration controller,
the information processing apparatus transmitting the pen angle and a movement direction of the pen to the pen,
the pen vibration controller generating a vibration waveform signal based on the pen angle and the movement direction of the pen received from the information processing apparatus.

8. An information processing apparatus comprising:
a display with a screen;
a touch sensor configured to detect a contact position of a pen having a vibration generator on the screen of the display;
an angle detector configured to detect a pen angle, which indicates a direction on the screen in which the pen in contact with the screen is tilted; and
a pen vibration controller configured to generate a vibration waveform signal based on the pen angle detected by the angle detector and a movement direction of the pen to vibrate the vibration generator based on the generated vibration waveform signal,
wherein the pen vibration controller is configured to generate the vibration waveform signal based on an azimuth angle, which indicates the movement direction relative to a direction indicated by the pen angle, and
wherein the pen vibration controller is configured to generate the vibration waveform signal based on reference vibration waveform information corresponding to each of a plurality of reference azimuth angles that are different predefined angles, and the azimuth angle.

9. A method for controlling an information processing system including a pen having a vibration generator, a display with a screen, and a touch sensor configured to detect a contact position of a pen on the screen of the display, the method comprising steps of:

an angle detector detecting a pen angle, which indicates a direction on the screen in which the pen in contact with the screen is tilted; and a pen vibration controller generating a vibration waveform signal based on the pen angle detected by the angle detector and a movement direction of the pen to vibrate the vibration generator based on the generated vibration waveform signal, wherein the pen vibration controller is configured to generate the vibration waveform signal based on an azimuth angle, which indicates the movement direction relative to a direction indicated by the pen angle, and wherein the pen vibration controller is configured to generate the vibration waveform signal based on reference vibration waveform information corresponding to each of a plurality of reference azimuth angles that are different predefined angles, and the azimuth angle.

* * * * *